(12) United States Patent
Park et al.

(10) Patent No.: US 11,314,990 B2
(45) Date of Patent: Apr. 26, 2022

(54) METHOD FOR ACQUIRING OBJECT INFORMATION AND APPARATUS FOR PERFORMING SAME

(71) Applicant: Seadronix Corp., Nam-gu Ulsan (KR)

(72) Inventors: Byeol Teo Park, Daejeon (KR); Han Keun Kim, Hwaseong-si (KR); Dong Hoon Kim, Daejeon (KR)

(73) Assignee: Seadronix Corp., Ulsan (KR)

( * ) Notice: Subject to any disclaimer, the term of this patent is extended or adjusted under 35 U.S.C. 154(b) by 161 days.

(21) Appl. No.: 16/766,549

(22) PCT Filed: Jul. 25, 2019

(86) PCT No.: PCT/KR2019/009241
§ 371 (c)(1),
(2) Date: May 22, 2020

(87) PCT Pub. No.: WO2020/050499
PCT Pub. Date: Mar. 12, 2020

(65) Prior Publication Data
US 2021/0374461 A1    Dec. 2, 2021

Related U.S. Application Data

(60) Provisional application No. 62/741,394, filed on Oct. 4, 2018, provisional application No. 62/726,913, filed on Sep. 4, 2018.

(30) Foreign Application Priority Data

Dec. 20, 2018 (KR) .................. 10-2018-0165860

(51) Int. Cl.
*G06K 9/62* (2006.01)
*G06K 9/00* (2006.01)
(Continued)

(52) U.S. Cl.
CPC ......... *G06K 9/627* (2013.01); *G06K 9/00624* (2013.01); *G06K 9/40* (2013.01); *G06N 3/0454* (2013.01)

(58) Field of Classification Search
None
See application file for complete search history.

(56) References Cited

U.S. PATENT DOCUMENTS 8,989,948 B2 * 3/2015 Huntsberger ............ G08G 3/00 701/28
10,394,242 B2 * 8/2019 Kaspi ................... G05D 1/0202
(Continued)

FOREIGN PATENT DOCUMENTS

EP    2049873 B1    10/2012
EP    3291206 A1    3/2018
(Continued)

OTHER PUBLICATIONS

Molina-Molina, J. Carlos, et al. "Autonomous Marine Robot Based on AI Recognition for Permanent Surveillance in Marine Protected Areas." Sensors 21.8 (2021): 2664. (Year: 2021).*
(Continued)

*Primary Examiner* — Andrae S Allison
(74) *Attorney, Agent, or Firm* — Fenwick & West LLP

(57) ABSTRACT

The present invention relates to a method for acquiring an object information, the method comprising: obtaining an input image acquired by capturing a sea; obtaining a noise level of the input image; when the noise level indicates a noise lower than a predetermined level, acquiring an object information related to an obstacle included in the input image from the input image by using a first artificial neural network, and when the noise level indicates a noise higher than the predetermined level, obtaining a noise-reduced image of which the environmental noise is reduced from the input image by using a second artificial neural network, and
(Continued)

acquiring an object information related to an obstacle included in the sea from the noise-reduced image by using the first artificial neural network.

16 Claims, 23 Drawing Sheets

(51) Int. Cl.
  *G06K 9/40* (2006.01)
  *G06N 3/04* (2006.01)

(56) References Cited

U.S. PATENT DOCUMENTS

| | | | |
|---|---|---|---|
| 10,803,360 B2 | 10/2020 | Park et al. | |
| 2005/0134440 A1 | 6/2005 | Breed | |
| 2010/0332475 A1 | 12/2010 | Birdwell et al. | |
| 2017/0323154 A1* | 11/2017 | Kollmann | G06K 9/6277 |
| 2018/0025644 A1* | 1/2018 | Jeong | G08G 3/02 701/300 |
| 2019/0258885 A1* | 8/2019 | Piette | G06K 9/6267 |
| 2020/0050202 A1* | 2/2020 | Suresh | G06T 7/593 |
| 2020/0050893 A1* | 2/2020 | Suresh | G05D 1/0206 |
| 2020/0074239 A1* | 3/2020 | Park | G06K 9/6262 |

FOREIGN PATENT DOCUMENTS

| | | |
|---|---|---|
| JP | 2004-175187 A | 6/2004 |
| JP | 2004-178258 A | 6/2004 |
| JP | 2009-122063 A | 6/2009 |
| JP | 2016-212849 A | 12/2016 |
| JP | 2017-215947 A | 12/2017 |
| KR | 10-2009-0035589 A | 4/2009 |
| KR | 10-2011-0059206 A | 6/2011 |
| KR | 10-2011-0113608 A | 10/2011 |
| KR | 10-1283759 B1 | 7/2013 |
| KR | 10-2014-0096595 A | 8/2014 |
| KR | 10-1452994 B1 | 10/2014 |
| KR | 10-2014-0126998 A | 11/2014 |
| KR | 10-2014-0133713 A | 11/2014 |
| KR | 10-2015-0125863 A | 11/2015 |
| KR | 10-2016-0001271 A | 1/2016 |
| KR | 10-2016-0129212 A | 11/2016 |
| KR | 10-2017-0031829 A | 3/2017 |
| KR | 10-2017-0065894 A | 6/2017 |
| KR | 10-1771146 B1 | 8/2017 |
| KR | 10-1772916 B1 | 8/2017 |
| KR | 10-2017-0117994 A | 10/2017 |
| KR | 10-2017-0133010 A | 12/2017 |
| KR | 10-1812994 B1 | 12/2017 |
| KR | 10-2018-0010633 A | 1/2018 |
| KR | 10-1805564 B1 | 1/2018 |
| KR | 10-2018-0065411 A | 6/2018 |
| KR | 10-2018-0081979 A | 7/2018 |

OTHER PUBLICATIONS

Hu, Xianjun, et al. "Deep Learning-Enabled Variational Optimization Method for Image Dehazing in Maritime Intelligent Transportation Systems." Journal of Advanced Transportation 2021 (2021). (Year: 2021).*
PCT International Search Report and Written Opinion, PCT Application No. PCT/KR2021/000036, dated Apr. 15, 2021, 17 pages.
Korean Intellectual Property Office, Notice of Allowance, Korean Patent Application No. 10-2020-0058550, dated Jan. 6, 2021, three pages.
Korean Intellectual Property Office, Notification of Reason for Refusal, Korean Patent Application No. 10-2020-0058550, dated Sep. 26, 2020, nine pages.
Daranda, A., "A Neural Network Approach To Predict Marine Traffic," Vilnius University Institute of Mathematics and Informatics Lithuania, Informatics Engineering (07 T), Oct. 2016, 26 pages, Technical Report MII-DS-07T-16-9-16.
Korean Intellectual Property Office, Office Action, Korean Patent Application No. 10-2018-0165857, dated Jul. 31, 2020, 16 pages.
Korean Intellectual Property Office, Notice of Allowance, Korean Patent Application No. 10-2018-0165861, dated Jul. 22, 2020, three pages.
United States Office Action, U.S. Appl. No. 16/557,859, dated Mar. 9, 2020, eight pages.
PCT International Search Report and Written Opinion, PCT Application No. PCT/KR2019/009241, dated Nov. 25, 2019, 11 pages (with English translation of International Search Report).
PCT International Search Report, PCT Application No. PCT/KR2019/009244, dated Nov. 26, 2019, 5 pages (with English translation of International Search Report).
Bovcon, Borja, et al., "Stereo Obstacle Detection for Unmanned Surface Vehicles by IMU-Assisted Semantic Segmentation," arXiv preprint arXiv: 1802.07956, Feb. 22, 2018, 14 pages.
Polvara, Riccardo, et al., "Obstacle Avoidance Approaches for Autonomous Navigation of Unmanned Surface Vehicles," The Journal of Navigation, vol. 71, No. 1, 2018. Jan. 2018, pp. 241-256.
Korean Notification of Reason for Refusal, Korean Application No. 10-2018-0165858, dated Feb. 21, 2019, 22 pages.
Korean Notification of Reason for Refusal, Korean Application No. 10-2018-0165860, dated Mar. 15, 2019, 7 pages.
Korean Notification of Reason for Refusal, Korean Application No. 10-2018-0165861, dated Feb. 11, 2020, 15 pages.
Korean Grant of Patent, Korean Application No. 10-2019-0122817, dated Mar. 25, 2020, 3 pages.
Korean Grant of Patent, Korean Application No. 10-2018-0165859, dated Mar. 26, 2020, 3 pages.
Korean Notification of Reason for Refusal, Korean Application No. 10-2019-0122817, dated Jan. 3, 2020, 18 pages.
Korean Notification of Reason for Refusal, Korean Application No. 10-2018-0165857, dated Jan. 30, 2020, 18 pages.

* cited by examiner

FIG. 6

| CLASSIFICATION VALUE | OBJECT INFORMATION |
|---|---|
| 1 | SHORT DISTANCE + GEOGRAPHICAL FEATURES |
| 2 | MIDDLE DISTANCE + GEOGRAPHICAL FEATURES |
| 3 | LONG DISTANCE + GEOGRAPHICAL FEATURES |
| 4 | SHORT DISTANCE + STATIONARY OBSTACLE |
| 5 | MIDDLE DISTANCE + STATIONARY OBSTACLE |
| 6 | LONG DISTANCE + STATIONARY OBSTACLE |
| 7 | SHORT DISTANCE + MOVING OBSTACLE |
| 8 | MIDDLE DISTANCE + MOVING OBSTACLE |
| 9 | LONG DISTANCE + MOVING OBSTACLE |
| 10 | OTHERS |

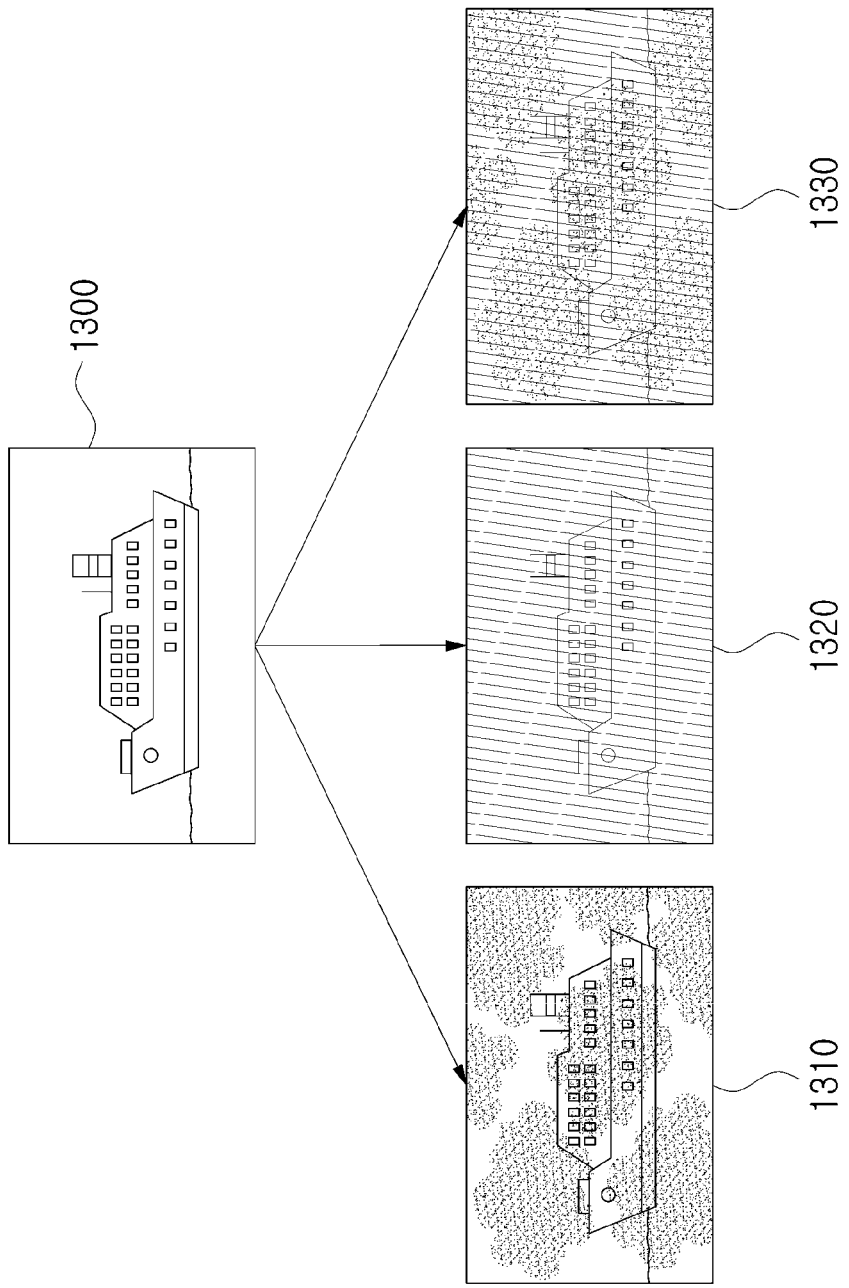

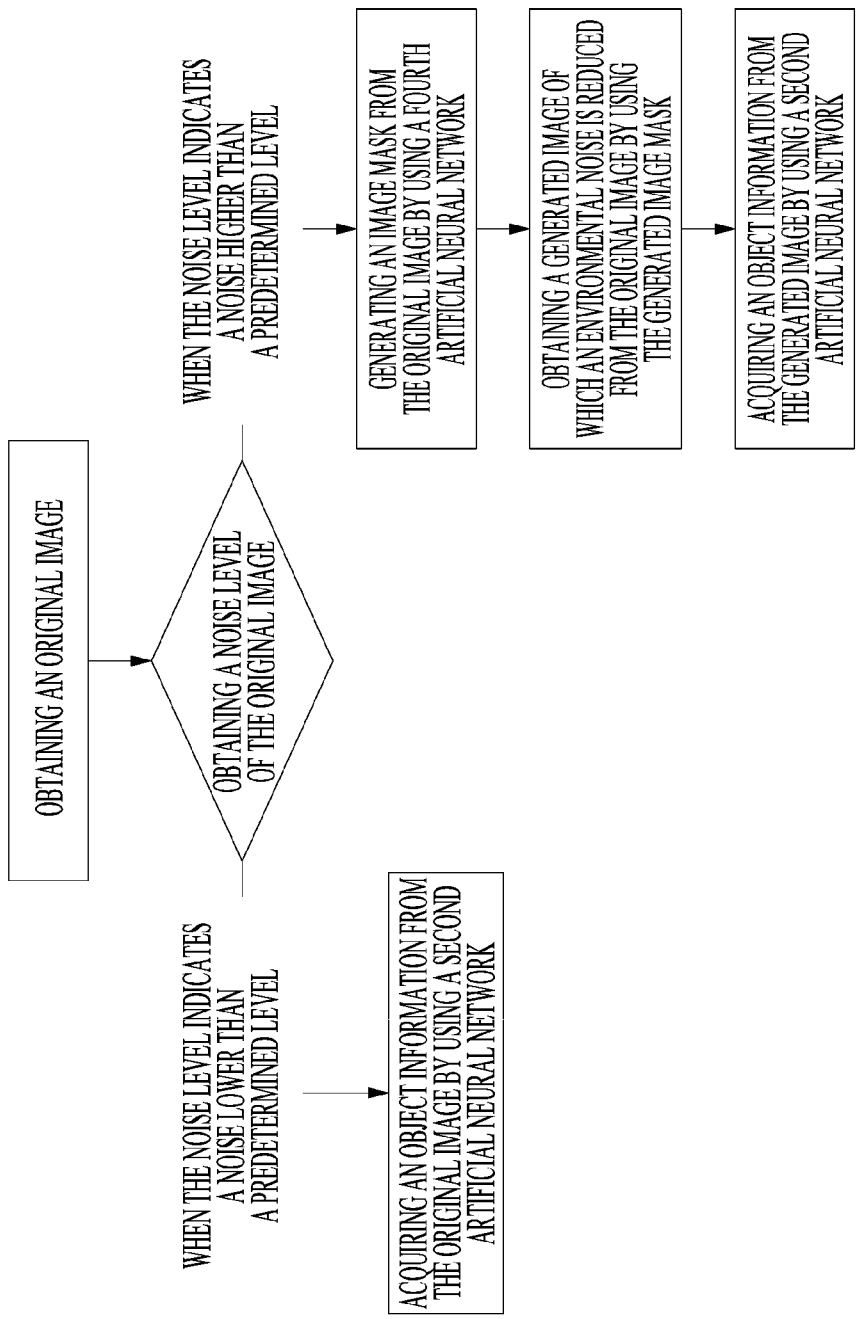

US 11,314,990 B2

METHOD FOR ACQUIRING OBJECT INFORMATION AND APPARATUS FOR PERFORMING SAME

TECHNICAL FIELD

The present invention relates to a method of acquiring object information, and more particularly, to a method of acquiring, from an image captured in a situation in which there is environmental noise, information regarding an object included in the image using an artificial neural network, and an apparatus for performing the same.

BACKGROUND ART

Now, this is the era of Artificial Intelligence (AI). Since AlphaGo became a topic of concern, active attempts to apply artificial intelligence to various industries have been made.

In recent years, artificial intelligence has been actively used in image processing techniques such as image recognition, analysis, generation, and synthesis. Recently, artificial intelligence has been installed in automobiles, vessels, drones, and the like and has been used to recognize surrounding obstacles and plan routes.

Meanwhile, when artificial intelligence is used for vessels to acquire information regarding surrounding obstacles, it is important to deal with environmental noise such as fog generated in a maritime environment.

DISCLOSURE

Technical Problem

An embodiment is directed to providing an object information acquisition method for acquiring object information of surrounding environments by performing image segmentation using an artificial neural network.

Another embodiment is directed to acquiring, from an image including environmental noise, object information of an obstacle included in the image using artificial intelligence.

Still another embodiment is directed to increasing the training efficiency of an artificial neural network by using, as training data of the artificial neural network, an image obtained by pre-processing a captured image.

The technical problems to be solved by the present invention are not limited to the aforementioned problems, and other problems that are not mentioned here can be clearly understood by those skilled in the art from the following description and the accompanying drawings.

Technical Solution

According to one embodiment, a method for acquiring an object information may be provided, the method comprising: a step of obtaining an input image capturing a sea; a step of obtaining a noise level of the input image; a first image processing step of when the noise level indicates a noise lower than a predetermined level, acquiring an object information related to an obstacle included in the input image from the input image by using a first artificial neural network wherein the first artificial neural network outputs, from an image, an object information related to at least one of a distance and a type of an object included in the image; and a second image processing step of when the noise level indicates a noise higher than the predetermined level, obtaining an image of which an environmental noise is reduced from the input image by using a second artificial neural network trained to generate, from a first image containing a noise, a second image of which a noise is reduced, and acquiring an object information related to an obstacle included in the sea from the image of which the environmental noise is reduced by using the first artificial neural network, wherein the second artificial neural network is trained by using a first error calculated from a third artificial neural network discriminating the second image and an image for comparison corresponding to the first image and having a noise lower than the first image.

According to another embodiment, a method for acquiring an object information may be provided, the method comprising: a step of obtaining an input image capturing a sea; a step of obtaining a noise level of the input image; a first image processing step of when the noise level indicates a noise lower than a predetermined level, acquiring an object information related to an obstacle included in the input image from the input image by using a first artificial neural network wherein the first artificial neural network outputs, from an image, an object information related to at least one of a distance and a type of an object included in the image; and a second image processing step of when the noise level indicates a noise higher than the predetermined level, generating an image mask from the input image by using a second artificial neural network trained to generate an image mask from a first image containing a noise, obtaining a generated image of which an environmental noise is reduced from the input image by using the image mask generated from the input image, and acquiring an object information related to an obstacle included in the sea from the generated image by using the first artificial neural network, wherein the second artificial neural network is trained by using a first error calculated from a third artificial neural network discriminating a second image and an image for comparison corresponding to the first image and having a noise lower than the first image, the second image being generated based on an image mask generated from the second artificial neural network and the first image.

According to yet another embodiment, a method for acquiring an object information including a type information and a distance information of an object around a vessel by using a marine image and an artificial neural network may be provided, the method comprising: a step of obtaining a marine image including a sea, an obstacle and an environmental noise captured by a camera mounted on the vessel; and a step of acquiring an object information included in the obtained marine image from the obtained marine image by using an artificial neural network trained based on a marine image having an environmental noise, wherein the artificial neural network is trained based on an output data and a labeling data corresponding each other, the output data and the labeling data including a first classification value determined by reflecting the type information and corresponding to a sea, and a second classification value determined by reflecting the distance information and the type information and corresponding to an obstacle.

According to yet another embodiment, a device for acquiring an object information may be provided, the device comprising: a camera mounted on a vessel and capturing a sea; and a controller configured to: obtain an input image captured by the camera; obtain a noise level of the input image; when the noise level indicates a noise lower than a predetermined level, perform a first image processing step of acquiring an object information related to an obstacle included in the input image from the input image by using a first artificial neural network wherein the first artificial neural network outputs, from an image, an object information related to at least one of a distance and a type of an object included in the image; and when the noise level indicates a noise higher than the predetermined level, perform a second image processing step of obtaining an image of which an environmental noise is reduced from the input image by using a second artificial neural network trained to generate, from a first image containing a noise, a second image of which a noise is reduced, and acquiring an object information related to an obstacle included in the sea from the image of which the environmental noise is reduced by using the first artificial neural network, wherein the second artificial neural network is trained by using a first error calculated from a third artificial neural network discriminating the second image and an image for comparison corresponding to the first image and having a noise lower than the first image.

Technical solutions of the present invention are not limited to the aforementioned solutions, and other solutions which are not mentioned here can be clearly understood by those skilled in the art from the following description and the accompanying drawings.

Advantageous Effects

According to an embodiment, it is possible to acquire object information of surrounding environments by performing image segmentation using an artificial neural network.

According to another embodiment, it is possible to acquire, from an image including environmental noise, object information of an obstacle included in the image by using artificial intelligence.

According to still another embodiment, it is possible to increase the training efficiency of the artificial neural network by using, as training data of the artificial neural network, an image obtained by pre-processing a captured image.

Advantageous effects of the present invention are not limited to the aforementioned effects, and other advantageous effects that are not described herein will be clearly understood by those skilled in the art from the following description and the accompanying drawings.

DESCRIPTION OF DRAWINGS

FIG. 6 is a table showing classification values according to an embodiment.

FIG. 7 is a diagram for describing data augmentation according to an embodiment.

FIG. 23 is a flowchart showing an object information acquisition method according to another embodiment.

BEST MODE

Figure 1:
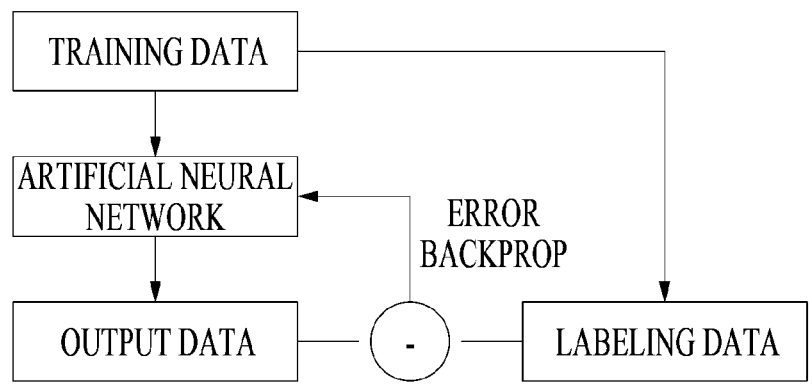
FIG. 1 is a block diagram showing a training method of an artificial neural network according to an embodiment.

The above objects, features, and advantages of the present invention will become more apparent from the following detailed description taken in conjunction with the accompanying drawings. Since the present invention may be variously modified and have several exemplary embodiments, specific embodiments will be shown in the accompanying drawings and described in detail.

In the figures, the thickness of layers and regions is exaggerated for clarity. Also, when it is mentioned that an element or layer is "on" another element or layer, the element or layer may be formed directly on another element or layer, or a third element or layer may be interposed therebetween. Like reference numerals refer to like elements throughout the specification. Further, like reference numerals will be used to designate like elements having similar functions throughout the drawings within the scope of the present invention.

Detailed descriptions about well-known functions or configurations associated with the present invention will be ruled out in order not to unnecessarily obscure subject matters of the present invention. It should also be noted that, although ordinal numbers (such as first and second) are used in the following description, they are used only to distinguish similar elements.

The suffixes "module" and "unit" for elements used in the following description are given or used interchangeably only for facilitation of preparing this specification, and thus they are not assigned a specific meaning or function.

According to one embodiment, a method for acquiring an object information may be provided, the method comprising: a step of obtaining an input image capturing a sea; a step of obtaining a noise level of the input image; a first image processing step of when the noise level indicates a noise lower than a predetermined level, acquiring an object information related to an obstacle included in the input image from the input image by using a first artificial neural network wherein the first artificial neural network outputs, from an image, an object information related to at least one of a distance and a type of an object included in the image; and a second image processing step of when the noise level indicates a noise higher than the predetermined level, obtaining an image of which an environmental noise is reduced from the input image by using a second artificial neural network trained to generate, from a first image containing a noise, a second image of which a noise is reduced, and acquiring an object information related to an obstacle included in the sea from the image of which the environmental noise is reduced by using the first artificial neural network, wherein the second artificial neural network is trained by using a first error calculated from a third artificial neural network discriminating the second image and an image for comparison corresponding to the first image and having a noise lower than the first image.

Herein, the first artificial neural network may be trained based on an output data and a labeling data corresponding to the output data, the output data including a first classification value determined by reflecting the type and corresponding to a sea, and a second classification value determined by reflecting the distance and the type and corresponding to an obstacle.

Herein, the environmental noise may include at least one of a rain, a fog and a cloud.

Herein, the step of obtaining the input image may comprise a step of selecting a portion of a plurality of images.

Herein, the step of selecting may be generating a third image by compositing a first image having the highest illuminance among the plurality of images and a second image having the lowest illuminance among the plurality of images.

Herein, the step of obtaining the input image may comprise a step of performing RGB normalization of the input image.

Herein, the step of obtaining the noise level may comprise a step of measuring an average focus measure of the input image.

Herein, the second artificial neural network may be trained to minimize the first error.

Herein, the second artificial neural network may be trained to minimize a second error calculated based on a comparison of a third image outputted from a fourth artificial neural network and the first image, the fourth artificial neural network generating the third image having a noise higher than the second image inputted to the fourth artificial neural network.

According to another embodiment, a method for acquiring an object information may be provided, the method comprising: a step of obtaining an input image capturing a sea; a step of obtaining a noise level of the input image; a first image processing step of when the noise level indicates a noise lower than a predetermined level, acquiring an object information related to an obstacle included in the input image from the input image by using a first artificial neural network wherein the first artificial neural network outputs, from an image, an object information related to at least one of a distance and a type of an object included in the image; and a second image processing step of when the noise level indicates a noise higher than the predetermined level, generating an image mask from the input image by using a second artificial neural network trained to generate an image mask from a first image containing a noise, obtaining a generated image of which an environmental noise is reduced from the input image by using the image mask generated from the input image, and acquiring an object information related to an obstacle included in the sea from the generated image by using the first artificial neural network, wherein the second artificial neural network is trained by using a first error calculated from a third artificial neural network discriminating a second image and an image for comparison corresponding to the first image and having a noise lower than the first image, the second image being generated based on an image mask generated from the second artificial neural network and the first image.

Herein, the first artificial neural network may be trained based on an output data and a labeling data corresponding to the output data, the output data including a first classification value determined by reflecting the type and corresponding to a sea, and a second classification value determined by reflecting the distance and the type and corresponding to an obstacle.

Herein, the input image may include a first input image and a second input image that is a subsequent frame of the first input image, and the second image processing step may include a first sub image processing step of when a difference between a first characteristic of the first input image and a second characteristic of the second input image is smaller than a predetermined reference value, generating a first image mask from the first input image, obtaining a first generated image of which an environmental noise is reduced from the first input image by using the first image mask, and acquiring an object information related to an obstacle included in the first input image from the first generated image by using the first artificial neural network, and a second sub image processing step of when the difference between the first characteristic and the characteristic is higher than the predetermined reference value, generating a second image mask from the second input image, obtaining a second generated image of which an environmental noise is reduced from the second input image by using the second image mask, and acquiring an object information related to an obstacle included in the sea from the second generated image by using the first artificial neural network.

Herein, each of the first characteristic and the second characteristic may include a noise level and a RGB value of a pixel.

Herein, the second artificial neural network may be trained to minimize a second error calculated based on a comparison of a third image outputted from a fourth artificial neural network and the first image, the fourth artificial neural network generating the third image having a noise higher than the second image inputted to the fourth artificial neural network.

Herein, the image mask may be maintained for a predetermined frame.

According to yet another embodiment, a method for acquiring an object information including a type information and a distance information of an object around a vessel by using a marine image and an artificial neural network may be provided, the method comprising: a step of obtaining a marine image including a sea, an obstacle and an environmental noise captured by a camera mounted on the vessel; and a step of acquiring an object information included in the obtained marine image from the obtained marine image by using an artificial neural network trained based on a marine image having an environmental noise, wherein the artificial neural network is trained based on an output data and a labeling data corresponding each other, the output data and the labeling data including a first classification value determined by reflecting the type information and corresponding to a sea, and a second classification value determined by reflecting the distance information and the type information and corresponding to an obstacle.

Herein, the second classification value may be determined by a combination of the type information and the distance information.

Herein, the type information may include a plurality of categories, each of which having a certain distance range.

According to yet another embodiment, a device for acquiring an object information may be provided, the device comprising: a camera mounted on a vessel and capturing a sea; and a controller configured to: obtain an input image captured by the camera; obtain a noise level of the input image; when the noise level indicates a noise lower than a predetermined level, perform a first image processing step of acquiring an object information related to an obstacle included in the input image from the input image by using a first artificial neural network wherein the first artificial neural network outputs, from an image, an object information related to at least one of a distance and a type of an object included in the image; and when the noise level indicates a noise higher than the predetermined level, perform a second image processing step of obtaining an image of which an environmental noise is reduced from the input image by using a second artificial neural network trained to generate, from a first image containing a noise, a second image of which a noise is reduced, and acquiring an object information related to an obstacle included in the sea from the image of which the environmental noise is reduced by using the first artificial neural network, wherein the second artificial neural network is trained by using a first error calculated from a third artificial neural network discriminating the second image and an image for comparison corresponding to the first image and having a noise lower than the first image.

An artificial neural network, which may be abbreviated as ANN, is a kind of algorithm that mathematically models a human brain's training method.

An artificial neural network may include a plurality of nodes, which are artificial neurons, and synapses connecting the plurality of nodes. An artificial neural network may include a layer including at least one node. For example, an artificial neural network may include an input layer, a hidden layer, and an output layer.

The input layer may receive input data from outside the artificial neural network and transmit the input data into the artificial neural network. The hidden layer may transmit, to the output layer, data calculated on the basis of synapse coupling strength and the input data transmitted from the input layer. The output layer may calculate output data on the basis of the data transmitted from the hidden layer and the synapse coupling strength.

The artificial neural network may include various neural networks. For example, an artificial neural network may include a convolution neural network (CNN) that extracts features using a filter. Alternatively, an artificial neural network may include a recurrent neural network (RNN) having a structure in which an output of a node is fed back as an input. In addition, an artificial neural network may include various kinds of neural networks such as Restricted Boltzmann Machine (RBM), Deep Belief Network (DBN), Generative Adversarial Network (GAN), and Relation Networks (RN).

Meanwhile, an artificial neural network may be trained in various ways. For example, an artificial neural network may include supervised learning, unsupervised learning, reinforcement learning, and imitation learning. In addition, an artificial neural network may be trained through various kinds of training methods.

FIG. 1 is a block diagram showing a training method of an artificial neural network according to an embodiment. Specifically, FIG. 1 may show supervised learning according to an embodiment.

Referring to FIG. 1, the artificial neural network may receive training data and output output data. The artificial neural network may be trained by backpropagation of an error calculated based on a comparison between the output data and labeling data.

The labeling data may be related to the training data. For example, the labeling data may include data calculated based on the training data.

The labeling data may include ground truth. Alternatively, the labeling data may be data generated through a user or a program.

Figure 2:
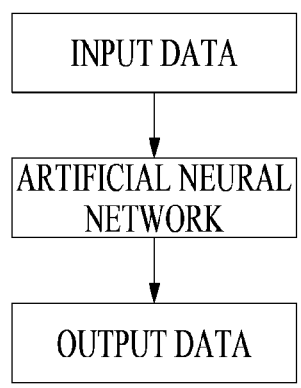
FIG. 2 is a block diagram of an inference step of an artificial neural network according to an embodiment.

FIG. 2 is a block diagram for an inference step of an artificial neural network according to an embodiment. Referring to FIG. 2, the trained artificial neural network may receive input data and output data.

The input data may include various forms of data. For example, the input data may include image data, audio data, and text data.

The output data may include various forms of data. For example, the output data may include image data, audio data, and text data.

The accuracy of the output data may vary depending on the training degree of the trained artificial network. Specifically, as the training degree increases, the accuracy of the output data may increase.

A method of acquiring information related to surrounding obstacles using an artificial neural network will be described below.

Figure 3:
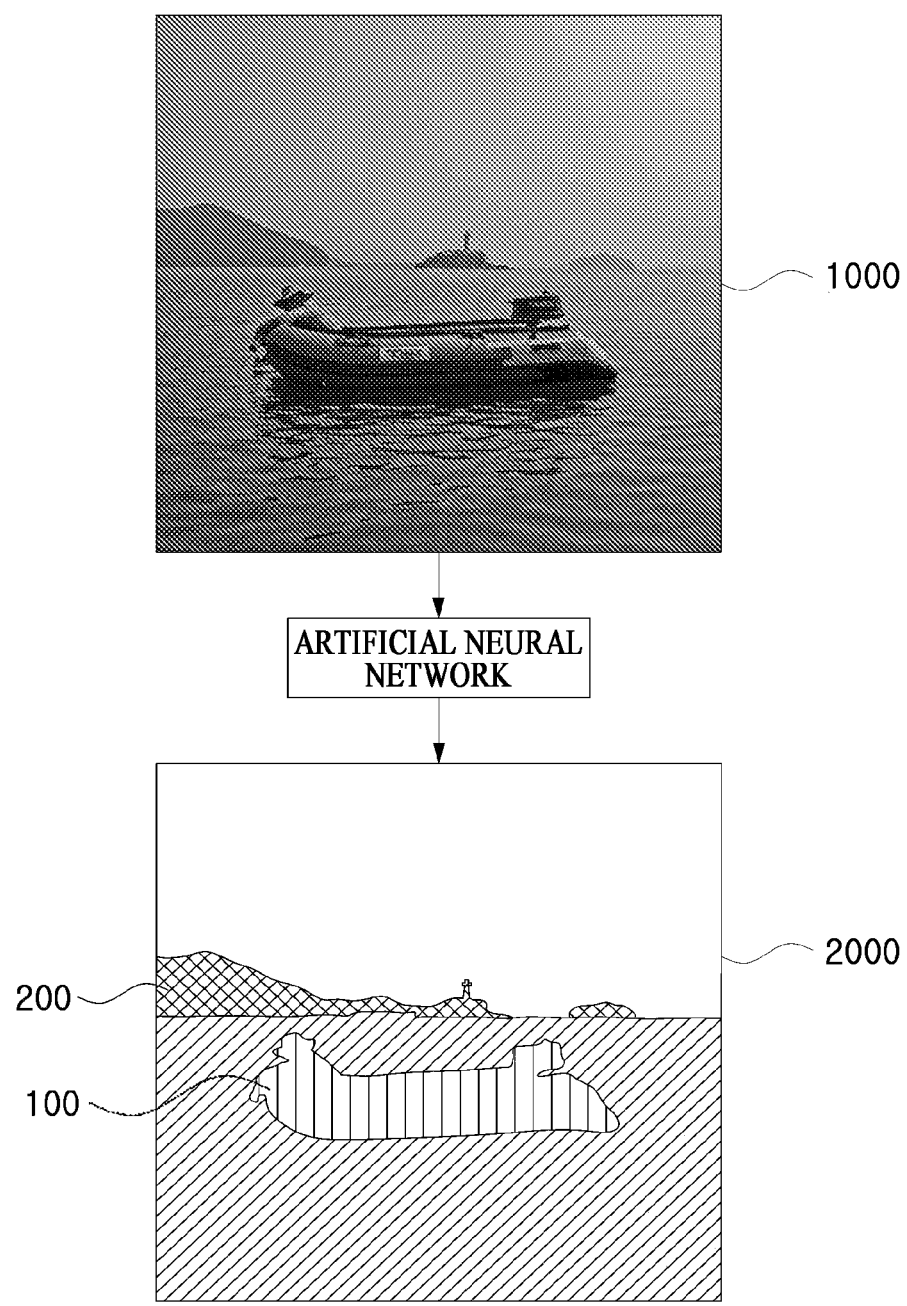
FIG. 3 is a diagram showing an object information acquisition method using an artificial neural network according to an embodiment.

FIG. 3 is a diagram showing an object information acquisition method using an artificial neural network according to an embodiment.

Referring to FIG. 3, the artificial neural network may receive input data and output output data. For example, the artificial neural network may receive a first image data 1000 and output a second image data 2000.

The first image data 1000 may be an image captured by a camera.

The second image data 2000 may be data generated based on the first image data 1000. For example, the second image data 2000 may include object information including at least one of type information and distance information of an object included in the first image data 1000.

The artificial neural network may receive the first image data 1000 and perform an image segmentation operation.

The image segmentation operation may refer to an image division operation, which is an operation of dividing an image area by attribute. The image segmentation operation may include an operation of allocating a predetermined attribute value to each pixel of an image. For example, the attribute may refer to the type of an object included in the image. That is, the image segmentation operation may include an operation of dividing an object included in an image for each pixel. Alternatively, the image segmentation operation may indicate which pixel corresponds to which object.

The attribute value may be expressed in various ways. For example, the attribute value may be expressed in color.

The image segmentation operation may be performed by a plurality of artificial neural networks. For example, the plurality of artificial neural networks may acquire object information by performing the image segmentation operation and combining results of the image segmentation operation.

Meanwhile, the artificial neural network may have various structures. For example, the artificial neural network may have an ENet structure.

Meanwhile, the first image data 1000 may be provided in various forms. For example, as shown in FIG. 3, the first image data 1000 may be provided as an image. Alternatively, the first image data 1000 may be provided as pixel data.

Figure 4:
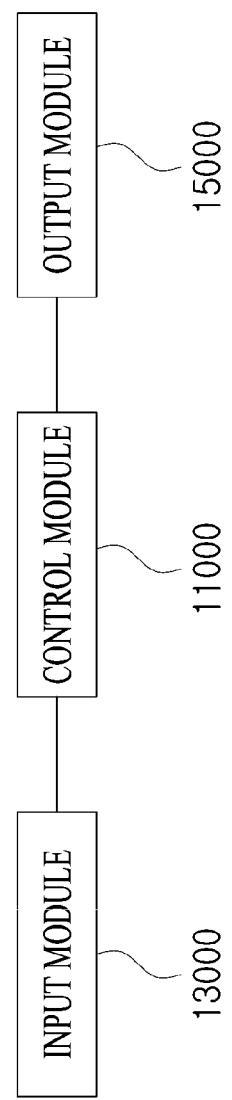
FIG. 4 is a diagram showing a system which performs computation related to surrounding environment detection, autonomous navigation, and the like according to an embodiment.

FIG. 4 is a diagram showing a system 10000 for performing computation related to surrounding environment detection, autonomous navigation, and the like according to an embodiment. The system 10000 may perform training and/or inference of an artificial neural network.

Referring to FIG. 4, the system 10000 may include a control module 11000, an input module 13000, and an output module 15000.

The control module 11000 may perform training and inference of an artificial neural network, image segmentation and thus may also perform surrounding environment detection, route planning such as obstacle map update and route generation, control signal generation for route tracking, autonomous navigation, and the like. Also, an operation of receiving various inputs through the input module 13000, an operation of outputting various outputs through the output module 15000, an operation of storing various kinds of data in a memory or acquiring various kinds of data from a memory, and the like may be performed through control of the control module 11000. Various kinds of operations or steps disclosed in embodiments of the present disclosure may be interpreted as being performed by the control module 11000 or performed by control of the control module 11000 unless otherwise stated.

The input module 13000 may receive information from outside the system 10000. The input module 13000 may be, for example, a vessel sensor system, which will be described below, but the present invention is not limited thereto.

The output module 15000 may output a result of the computation performed by the control module 11000. For example, the output module 15000 may output an image such as a maritime image, an image segmentation result, a control signal, and the like. The output module 15000 may be, for example, a display, a signal output circuit, or the like, but the present invention is not limited thereto.

The input module 13000 and the output module 15000 may be separate modules but may be implemented as one module. For example, the input module 13000 and the output module 15000 may be implemented as one integrated module, and the integrated module may receive information from the outside and output a result of the computation performed by the control module 11000.

The control module 11000, the input module 13000, and the output module 15000 may include a control unit. The control unit may perform processing and computation on various kinds of information and may control other elements included in the modules. The control unit may be provided in the form of an electronic circuit that physically processes electric signals. The modules may physically include only a single control unit but may alternatively include a plurality of control units. As an example, the control unit may be one or a plurality of processors installed in one computing means. As another example, the control unit may be provided as processors installed in physically separated servers and terminals to collaborate through communication.

The control module 11000, the input module 13000, and the output module 15000 may include a communication unit. The modules may transmit and receive information through the communication units. For example, the input module 13000 may transmit information acquired from the outside through the communication unit thereof, and the control module 11000 may receive information transmitted by the input module 13000 through the communication unit thereof. As another example, the control module 11000 may transmit the computation result through the communication unit thereof, and the output module 15000 may receive the information transmitted by the control module 11000 through the communication unit thereof. The communication unit may perform wired or wireless communication. The communication unit may perform bidirectional or unidirectional communication.

The control module 11000, the input module 13000, and the output module 15000 may include a memory. The memory may store various processing programs, parameters for processing programs, data obtained through such processing, and the like. For example, the memory may store data necessary for learning and/or inference, an artificial neural network being trained or already trained, and the like. The memory may be implemented as a non-volatile semiconductor memory, a hard disk, a flash memory, a random access memory (RAM), a read-only memory (ROM), an electrically erasable programmable read-only memory (EEPROM), or other tangible non-volatile recording media.

The system 10000 shown in FIG. 4 is merely an example, and the configuration of the system 10000 is not limited thereto.

Figure 5:
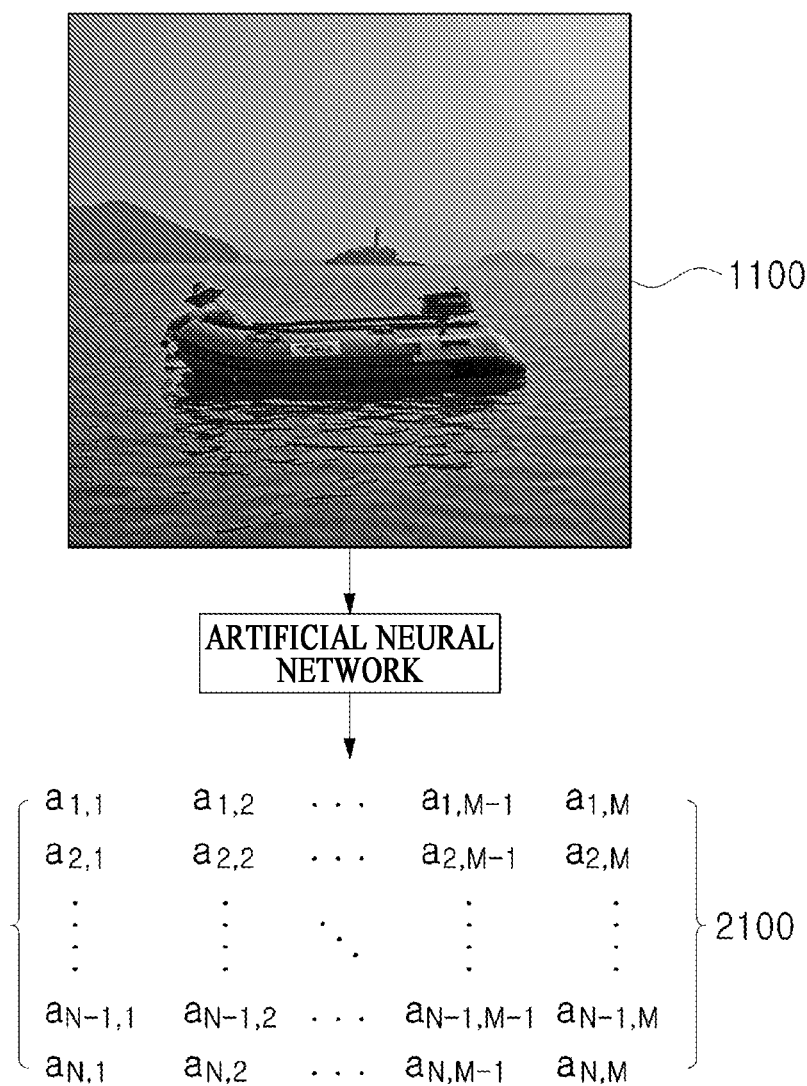
FIG. 5 is a diagram for describing an image segmentation operation of an artificial neural network according to an embodiment.

FIG. 5 is a diagram for describing an image segmentation operation of an artificial neural network according to an embodiment.

Referring to FIG. 5, the artificial neural network may receive a first image 1100 and output a first output data 2100. The first output data 2100 may be an N×M matrix. In this case, N may be equal to M. The number of elements of the matrix may be equal to the number of pixels of the first image 1100. That is, the first image 1100 may include N×M pixels.

Each of the pixels of the first image 1100 may correspond to each of the elements of the matrix. For example, each of the pixels of the first image 1100 may correspond one-to-one to each of the elements of the matrix. Alternatively, a set of pixels of the first image 1100 may correspond to each element of the matrix.

The first output data 2100 may include various kinds of information. For example, the first output data 2100 may include distance information included in an object included in the first image 1100. Alternatively, the first output data 2100 may include type information of the object.

Meanwhile, each of the elements of the matrix may have a predetermined classification value. Herein, the classification value may be a value that reflects the object information included in each pixel of the first image 1100. Accordingly, each element of the matrix may include objection information corresponding to each pixel of the first image 1100.

The classification value may be determined by various kinds of object information. For example, the classification value may be determined by the distance information and the type information of the object.

FIG. 6 is a table showing classification values according to an embodiment.

Referring to FIG. 6, a classification value may include object information. For example, the classification value may include distance information and type information of an object.

Meanwhile, the distance information may have a specific distance value in meters. For example, the distance information may have a distance value such as 10 m.

Alternatively, the distance information may be classified as a category having a predetermined range. For example, the category may include short distance, middle distance, and long distance according to the distance of the object. Specifically, 0 to 10 m may be classified as short distance, 10 to 20 m may be classified as middle distance, and 20 to 30 m may be classified as long distance.

The type information may include data related to the type of the object.

For example, the object may be classified into terrain, a stationary obstacle, a dynamic obstacle, and others according to its type. The terrain may include a mountain. The stationary obstacle may include an island, a reef, and the like. The dynamic obstacle may include a vessel.

Meanwhile, the classification value may be determined based on the distance information and the type information. For example, a first classification value may indicate that an object is terrain located within a short distance.

Meanwhile, at least some of the classification values may not include the distance information. For example, a first classification value corresponding to a sea may not include the distance information.

That is, the classification value should not be necessarily determined based on both of the distance information and the type information. For example, the classification value may be determined based on only the type information.

Also, the classification value may be determined based on additional information as well as the distance information and the type information. For example, the additional information may include direction information, speed information, a course sign, and the like of the object.

Meanwhile, the output data output from the artificial neural network may be an image data. For example, the image data may include RGB data corresponding to the classification value.

Referring to FIG. 3 again, the artificial neural network may receive the first image data 1000 and output the second image data 2000. Each pixel of the second image data 2000 may include an object information included in the first image data 1000.

Each pixel of the second image data 2000 may include RGB data corresponding to the classification value in which the object information is reflected.

For example, a first object 100, which is a dynamic obstacle located within a short distance, may correspond to classification value 7 of FIG. 5. Also, a second object 200, which is terrain located at a long distance, may correspond to classification value 3 of FIG. 5.

The classification value 7 may correspond to a seventh color. The classification value 3 may correspond to a third color.

Accordingly, the first object 100 may be expressed as the seventh color. The second object 200 may be expressed as the third color.

Meanwhile, the artificial neural network may perform a pre-processing operation before performing the image segmentation operation.

For example, the artificial neural network may receive a plurality of images and perform an operation of selecting a portion of the plurality of images.

Specifically, the artificial neural network may generate a third image by compositing a first image having the highest illuminance and a second image having the lowest illuminance among the plurality of images. The artificial neural network may acquire an output data by performing the image segmentation operation on the basis of the third image.

Through the selection operation, it is possible to improve the accuracy of the output data acquired from the artificial neural network.

Also, the artificial neural network may sample one image among the plurality of images. For example, the artificial neural network may sample an image having the highest focus value (or focus measure) and an illuminance value closest to a predetermined value among the plurality of images. The artificial neural network may perform the image segmentation operation on the basis of the sampled image. Thus, it is possible to improve the accuracy of the output data calculated through the image segmentation operation.

As another example of the pre-processing operation, the artificial neural network may perform an RGB normalization operation.

Meanwhile, the artificial neural network may be trained in various ways.

For example, the artificial neural network may receive training data and output data. An error calculated based on a difference between the output data and labeling data related to the training data is propagated back to the artificial neural network, and thus the artificial neural network may be trained.

The training data may be image data. The image data may include a maritime image acquired by capturing a sea.

The training data may include a plurality of image data acquired through data augmentation from any image.

FIG. 7 is a diagram for describing data augmentation according to an embodiment. Referring to FIG. 7, a plurality of generated images may be generated from an original image 1300. A plurality of generated images may be generated from the original image 1300 in consideration of various weather conditions or environmental noise.

For example, a first generated image 1310 may be an image with fog added to the original image 1300. Alternatively, the degree of fog of the first generated image 1310 may be higher than the degree of fog of the original image 1300. A second generated image 1320 may be an image with rain added to the original image 1300. A third generated image 1330 may be an image with fog and rain added to the original image 1300.

The artificial neural network may be trained based on the first generated image 1310, the second generated image 1320, and the third generated image 1330. Thus, it is possible to improve the training efficiency of the artificial neural network.

Meanwhile, the artificial neural network may be trained based on various labeling data. As an example, when the artificial neural network outputs a classification value corresponding to an object included in an input image, the artificial neural network may be trained based on labeling data including the classification value for the object.

As another example, when the artificial neural network outputs RGB data corresponding to the classification value corresponding to the object included in the input image, the artificial neural network may be trained based on the RGB data corresponding to the classification value for the object.

In the training step of the artificial neural network, the pre-processing operation may be performed. Thus, it is possible to improve the training efficiency of the artificial neural network.

Operating and training methods of an artificial neural network that receives an image and acquires object information of an obstacle included in the image have been described above. Meanwhile, the accuracy of output data output from an artificial neural network may change when an image input to the artificial neural network includes environmental noise. Accordingly, it may be necessary to process the image input to the artificial neural network.

A method of acquiring object information for an obstacle included in the input image from the input image including the environmental noise will be described below.

Figure 8:
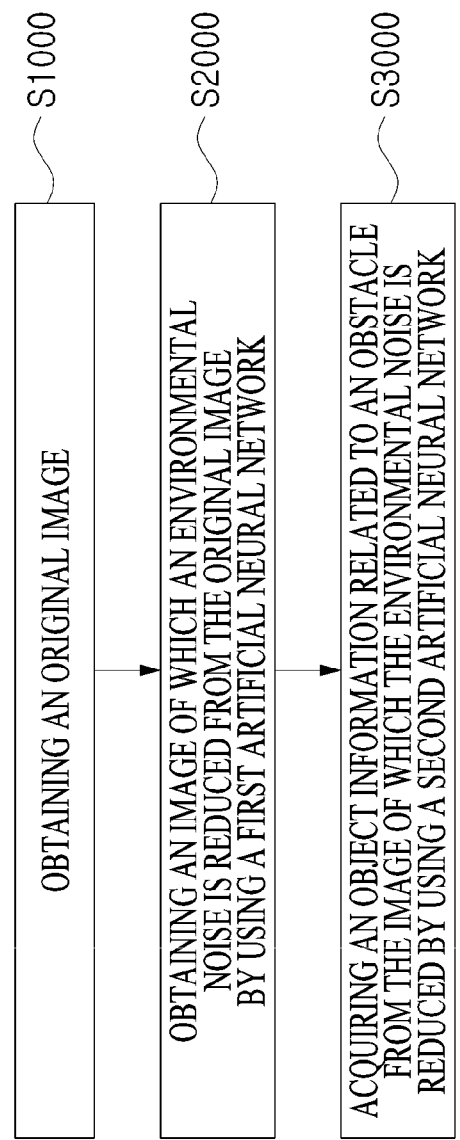
FIG. 8 is a flowchart showing an object information acquisition method according to an embodiment.

FIG. 8 is a flowchart showing an object information acquisition method according to an embodiment.

Referring to FIG. 8, the object information acquisition method may include a step of obtaining an original image (S1000), a step of obtaining an image of which an environmental noise is reduced from the original image by using a first artificial neural network (S2000), and a step of acquiring an object information related to an obstacle from the image of which the environmental noise is reduced by using a second artificial neural network (S3000).

Herein, the original image may include a raw image obtained by capturing a sea and an image obtained by pre-processing the raw image. The pre-processing may include a step of adjusting the capacity, size, color, etc. of the raw image. Also, the original image may be expressed in the same way as the input image. This also applies to the following.

Each step will be described in detail below.

First, a control unit 1 may obtain an original image (S1000). The original image may be provided as an image captured by a camera. For example, the original image may be a maritime image acquired by capturing a sea through a camera. Although not shown, the control unit 1 may include GPU, CPU, MCU, MPU, and the like.

The original image may include environmental noise. The environmental noise may refer to noise that exists around a place where the camera is installed, such as rain, fog, cloud, dust, and the like.

The control unit 1 may obtain a generated image of which an environmental noise is reduced from the original image by using a first artificial neural network N1 (S2000). For example, the degree of fog of the generated image may be lower than the degree of fog of the original image. Alternatively, the generated image may not include the environmental noise included in the original image.

The first artificial neural network N1 may perform the pre-processing operation. For example, the first artificial neural network N1 may perform an operation of selecting a portion of the original image. Alternatively, the first artificial neural network N1 may perform an RGB normalization operation.

The control unit 1 may acquire an object information related to an obstacle included in the original image from the generated image of which the environmental noise is reduced using a second artificial neural network N2 (S3000).

The second artificial neural network N2 may perform the image segmentation operation that has been described with reference to FIGS. 3 to 7. For example, the second artificial neural network N2 may receive a maritime image and output an output data including an object information related to an obstacle included in the maritime image. The object information may include distance information of the obstacle and type information of the obstacle.

Meanwhile, the control unit 1 may control operation of the first artificial neural network N1 and the second artificial neural network N2. For example, when the noise level of the original image indicates noise lower than a predetermined level, the control unit 1 may deactivate the first artificial neural network N1.

Figure 9:
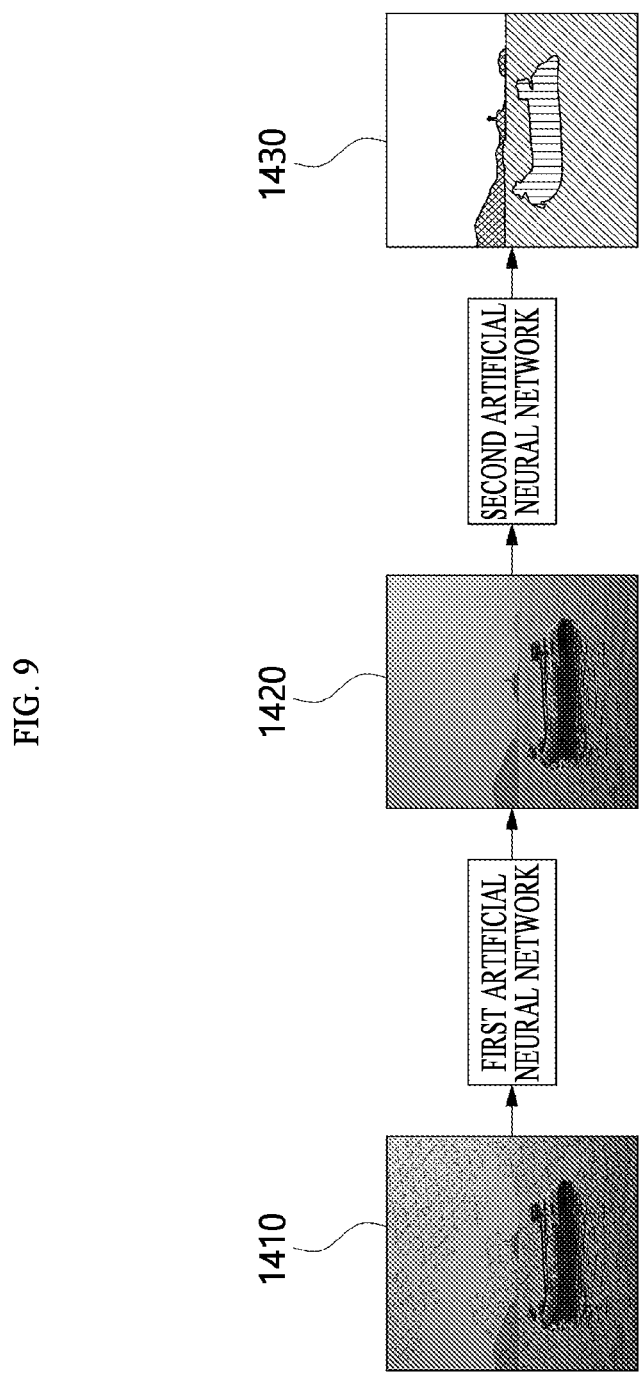
FIG. 9 is a diagram for describing an object information acquisition method according to an embodiment.

FIG. 9 is a diagram for describing an object information acquisition method according to an embodiment.

Referring to FIG. 9, the first artificial neural network N1 may receive an original image 1410 and output a generated image 1420 of which an environmental noise is reduced from the original image 1410. The second artificial neural network N2 may receive the generated image 1420 output from the first artificial neural network N1 and output an output data 1430. The output data 1430 may include an object information related to an obstacle included in the original image 1410.

The first artificial neural network N1 may perform the pre-processing operation. Alternatively, the pre-processing operation may also be performed by the second artificial neural network N2.

The second artificial neural network N2 may output distance information and type information related to an object included in the original image by performing the image segmentation operation.

Meanwhile, the first artificial neural network N1 and the second artificial neural network N2 may be formed as one neural network. In this case, the neural network may output the distance information and the type information related to the object included in the original image 1410 from the original image 1410.

Figure 10:
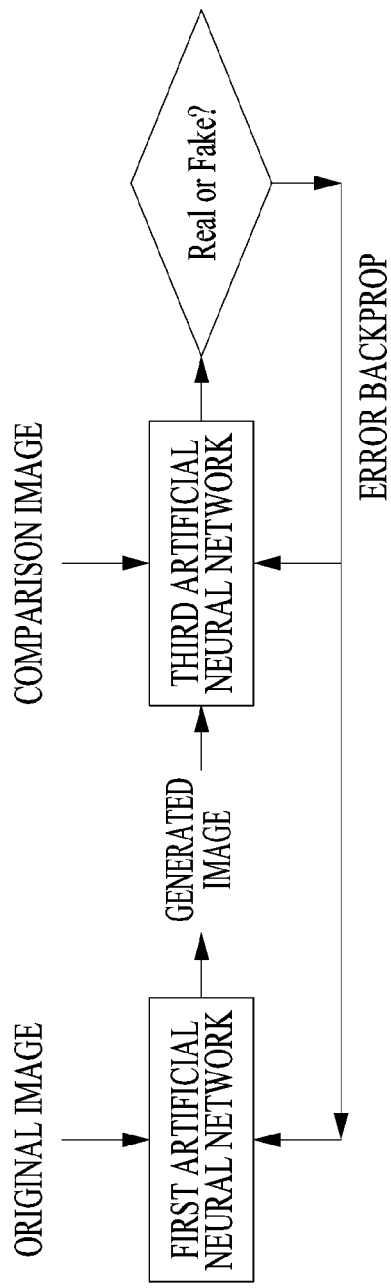
FIG. 10 is a diagram for describing a training method of a first artificial neural network N1 according to an embodiment.

FIG. 10 is a diagram for describing a training method of a first artificial neural network N1 according to an embodiment.

Referring to FIG. 10, the first artificial neural network N1 may receive an original image and output a generated image. The original image may be an image captured by a camera. The original image may be training data for the first artificial neural network N1. The original image may include the environmental noise.

The generated image may be input to a third artificial neural network N3. The generated image may be an image of which the environmental noise is reduced from the original image.

The third artificial neural network N3 may distinguish between the generated image and a comparison image corresponding to the generated image. The comparison image may be an image of which the environmental noise is reduced from the original image. Alternatively, the comparison image may be an image of which the environmental noise is removed from the original image. The comparison image may be a labeling data. For example, the comparison image may include ground truth. Alternatively, the comparison image may be generated through a user or a program.

For example, the third artificial neural network N3 may select one of the generated image and the comparison image. An error may be calculated based on the selection. The first artificial neural network N1 and the third artificial neural network N3 may be trained by the error being propagated back to at least one of the first artificial neural network N1 and the third artificial neural network N3. An error propagated back to the first artificial neural network N1 may be different from an error propagated back to the third artificial neural network N3.

The first artificial neural network N1 and the third artificial neural network N3 may form a generative adversarial network (GAN).

The first artificial neural network N1 trained through the above training process may generate an image of which an environmental noise is reduced from the original image including the environmental noise.

Figure 11:
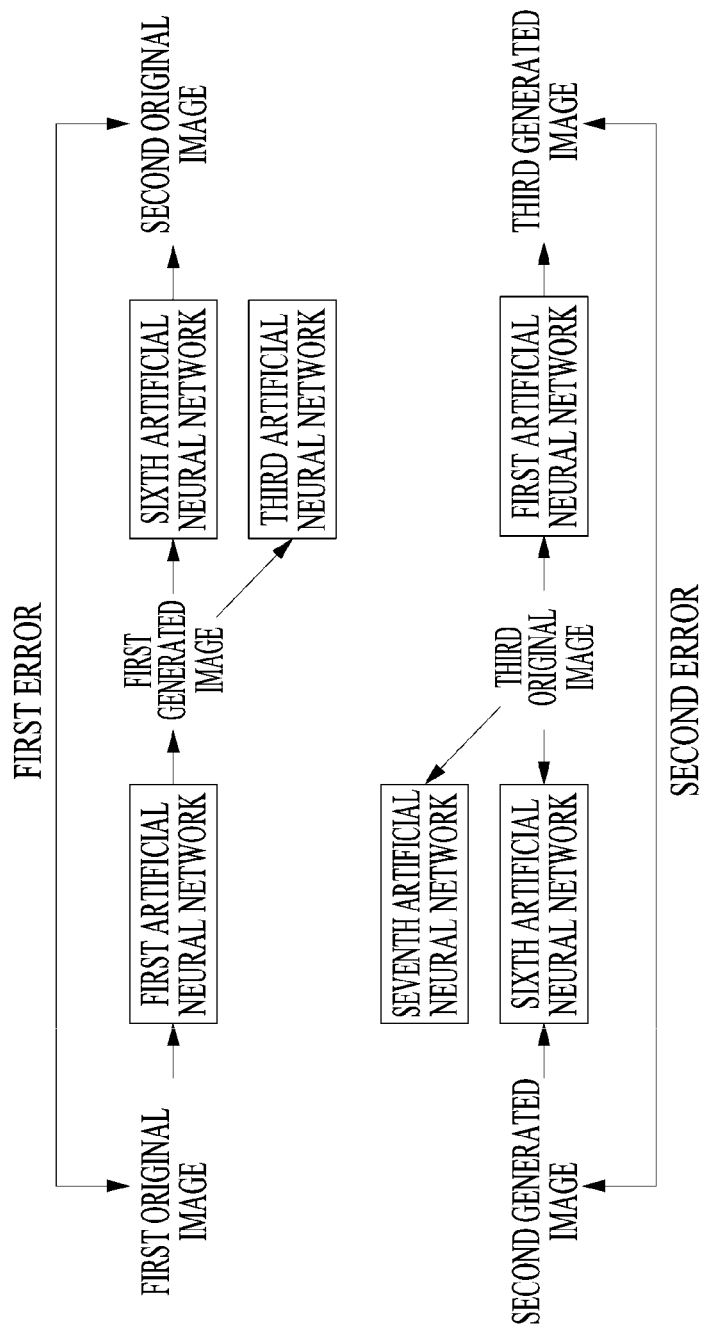
FIG. 11 is a diagram for describing a training method of the first artificial neural network N1 according to another embodiment.

FIG. 11 is a diagram for describing a training method of the first artificial neural network N1 according to another embodiment.

Referring to FIG. 11, the first artificial neural network N1 may receive a first original image and output a first generated image. The first original image may be an image captured by a camera. The first original image may be a training data for the first artificial neural network N1. The first original image may include the environmental noise.

The first generated image may be input to the third artificial neural network N3. The first generated image may be an image of which the environmental noise is reduced from the first original image.

The third artificial neural network N3 may distinguish between the first generated image and a first comparison image corresponding to the first generated image. The first comparison image may be an image of which the environmental noise is reduced from the first original image. Alternatively, the first comparison image may be an image of which the environmental noise is removed from the first original image. The first comparison image may be a labeling data. For example, the first comparison image may include ground truth. Alternatively, the first comparison image may be generated through a user or a program.

For example, the third artificial neural network N3 may select one of the first generated image and the first comparison image. An error may be calculated based on the selection. The first artificial neural network N1 and the third artificial neural network N3 may be trained by the error being propagated back to at least one of the first artificial neural network N1 and the third artificial neural network N3. An error propagated back to the first artificial neural network N1 may be different from an error propagated back to the third artificial neural network N3.

The first artificial neural network N1 and the third artificial neural network N3 may form a generative adversarial network (GAN).

Meanwhile, a sixth artificial neural network N6 may receive the first generated image and output a second original image. The second original image may be an image of which an environmental noise is increased from the first generated image.

A first error may be calculated based on the first original image and the second original image. The first artificial neural network N1 may be trained such that the first error is minimized.

The sixth artificial neural network N6 may receive a second generated image and output a third original image. The second generated image may be an image of which an environmental noise is reduced from the third original image. Alternatively, the second generated image may have a lower environmental noise level than the third original image.

The third original image may be an image of which an environmental noise is increased from the second generated image. The third original image may be input to a seventh artificial neural network N7.

The seventh artificial neural network N7 may distinguish between the third original image and a second comparison image corresponding to the second generated image. The second comparison image may be an image of which the environmental noise is increased from the second generated image. The second comparison image may be a labeling data. For example, the second comparison image may include ground truth. Alternatively, the second comparison image may be generated through a user or a program.

For example, the seventh artificial neural network N7 may select one of the third original image and the second comparison image. An error may be calculated based on the selection. The sixth artificial neural network N6 and the seventh artificial neural network N7 may be trained by the error being propagated back to at least one of the sixth artificial neural network N6 and the seventh artificial neural network N7. An error propagated back to the sixth artificial neural network N6 may be different from an error propagated back to the seventh artificial neural network N7.

The sixth artificial neural network N6 and the seventh artificial neural network N7 may form a generative adversarial network (GAN).

Meanwhile, the first artificial neural network N1 may receive the third original image and output the third generated image. The third generated image may be an image of which an environmental noise is reduced from the third original image.

A second error may be calculated based on the second generated image and the third generated image. The first artificial neural network N1 may be trained such that the second error is minimized.

The first artificial neural network N1 trained through the above training process may generate an image of which the environmental noise is reduced from the original image including the environmental noise.

Figure 12:
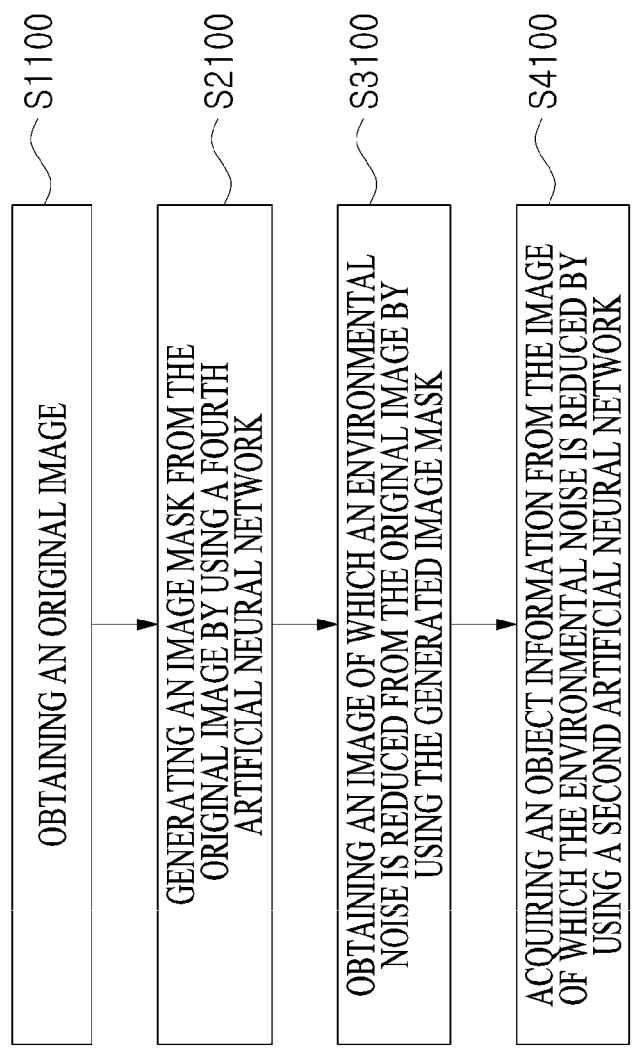
FIG. 12 is a flowchart showing an object information acquisition method according to another embodiment.

FIG. 12 is a flowchart showing an object information acquisition method according to another embodiment.

Referring to FIG. 12, the object information acquisition method may include a step of obtaining an original image (S1100), a step of generating an image mask from the original image by using a fourth artificial neural network (S2100), a step of obtaining an image of which an environmental noise is reduced from the original image by using the generated image mask (S3100), and a step of acquiring an object information from the image of which the environmental noise is reduced by using a second artificial neural network (S4100).

Each step will be described in detail below.

First, the control unit 1 may obtain an original image (S1100). The original image may be provided as an image captured by a camera. For example, the original image may be a maritime image acquired by capturing a sea through a camera.

The original image may include environmental noise. The environmental noise may refer to noise that exists around a place where the camera is installed, such as rain, fog, cloud, dust, and the like.

The control unit 1 may generate an image mask from the original image using a fourth artificial neural network (S2100).

The image mask may be related to the original image. The image mask may be provided as an image filter generated based on the original image.

The image mask may include various kinds of filters. For example, the image mask may include a deconvolution filter. Alternatively, the image mask may include a sharpen filter.

The control unit 1 may obtain an image of which an environmental noise is reduced from the original image using the generated image mask (S3100). For example, the step of obtaining of the image of which the environmental noise is reduced may include a convolution computation operation based on the image mask and the original image.

The control unit 1 may acquire an object information related to an obstacle from the image of which the environmental noise is reduced using a second artificial neural network (S4100).

The second artificial neural network may include the object information of the obstacle included in the original image acquired from the image of which the environmental noise is reduced by performing the image segmentation operation.

Figure 13:
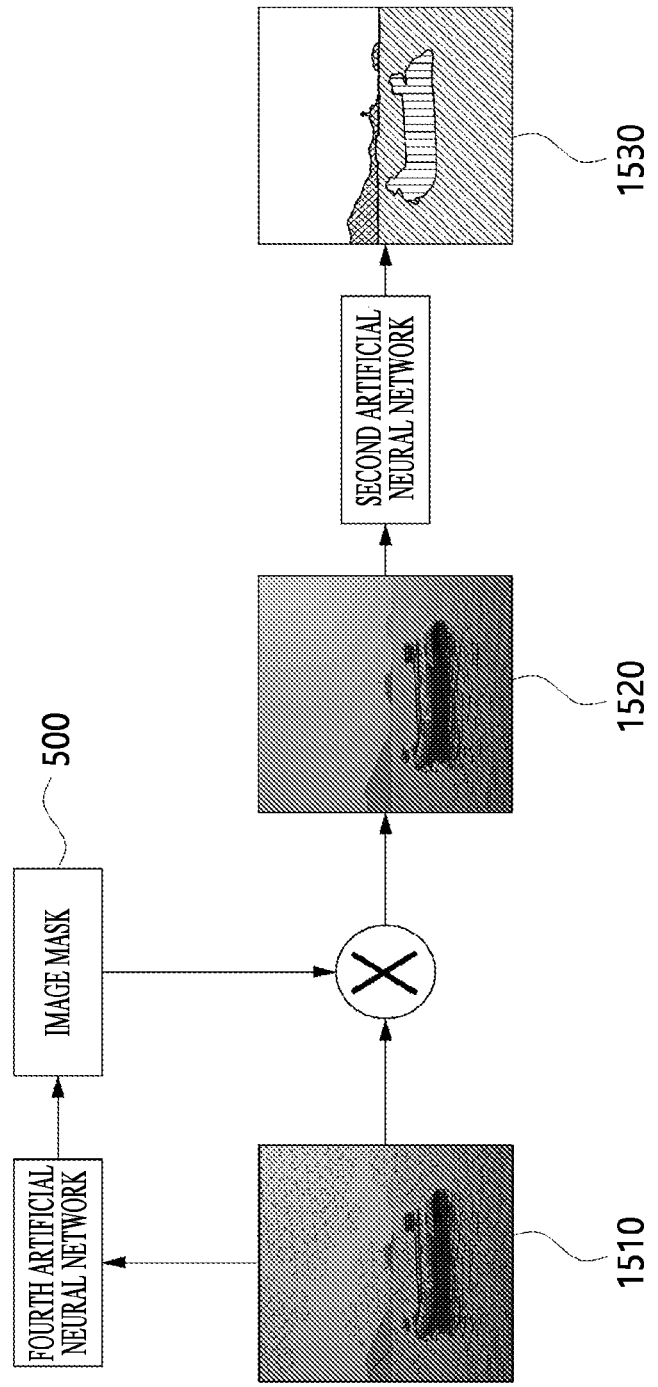
FIG. 13 is a diagram showing the object information acquisition method of FIG. 12.

FIG. 13 is a diagram showing the object information acquisition method of FIG. 12.

Referring to FIG. 13, a fourth artificial neural network N4 may generate an image mask 500 from an original image 1510 including environmental noise. The fourth artificial neural network N4 may perform the pre-processing operation before or while generating the image mask 500. For example, the fourth artificial neural network N4 may perform an operation of selecting a portion of a plurality of original images.

The control unit 1 may output a generated image 1520 of which an environmental noise is reduced from the original image 1510 by using the generated image mask 500. For example, the control unit 1 may output the generated image 1520 by performing convolution computation on the original image 1510 and the image mask 500.

The second artificial neural network N2 may receive the generated image 1520 and output data 1530 including an object information related to an object included in the original image 1510. For example, by performing the image segmentation operation, the second artificial neural network N2 may output an image expressed in color in which distance information and type information of the object included in the original image 1510 are reflected.

The second artificial neural network N2 may perform the pre-processing operation. For example, the second artificial neural network N2 may perform an operation of selecting a portion of a plurality of generated images 1520. Alternatively, the second artificial neural network N2 may perform an RGB normalization operation on the generated image 1520.

Meanwhile, the image mask may be maintained during a predetermined frame.

For example, when the difference between a first original image and a second original image, which is a frame subsequent to the first original image, is within a predetermined range, a first image mask generated based on the first original image may be applied to the second original image. That is, a generated image corresponding to the second original image may be output on the basis of the first image mask and the second original image.

Thus, it is possible to reduce the total amount of computation of the control unit 1. That is, it is possible to increase the object information acquisition speed.

The difference between the first original image and the second original image may be calculated in various ways. For example, the difference may be calculated on the basis of RGB data distributions of the first original image and the second original image. Specifically, when the difference between RGB data of the first original image and RGB data of the second original image is smaller than a predetermined range, the first image mask may be applied to the second original image.

The second artificial neural network N2 and the fourth artificial neural network N4 may be formed as one neural network. In this case, the neural network may output the distance information and the type information related to the object included in the original image from the original image.

Figure 14:
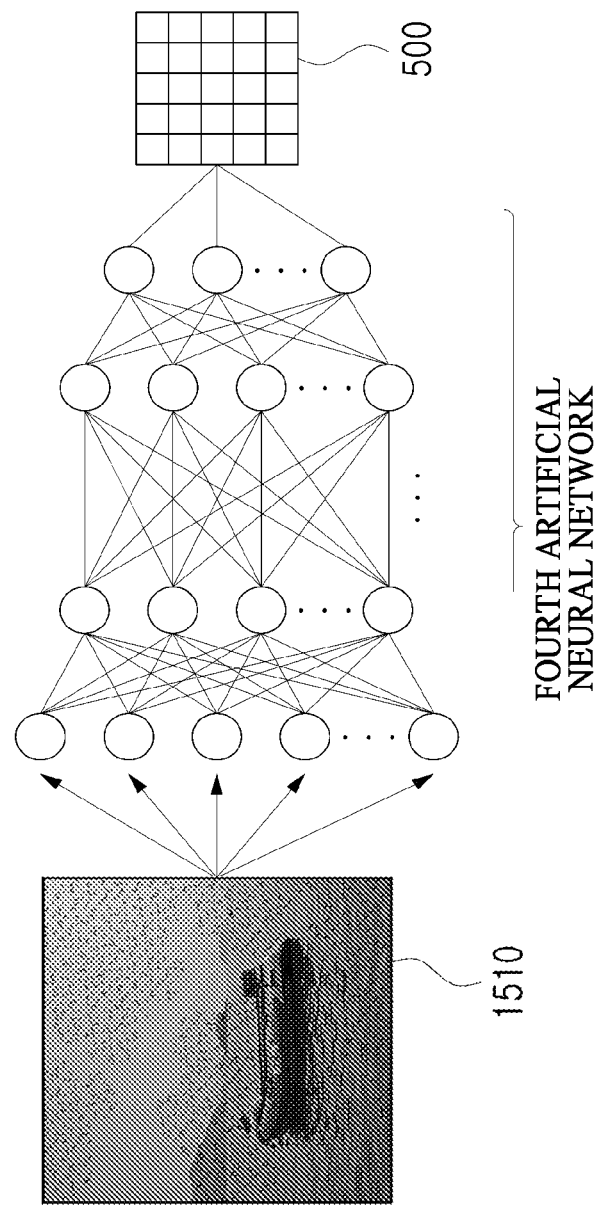
FIG. 14 is a diagram for describing a method of generating an image mask 500 according to an embodiment.

FIG. 14 is a diagram for describing a method of generating the image mask 500 according to an embodiment.

Referring to FIG. 14, the fourth artificial neural network N4 may receive the original image 1510 and output the image mask 500.

The fourth artificial neural network N4 may include a plurality of layers including a plurality of nodes. For example, the fourth artificial neural network N4 may include an input layer corresponding to pixels of the original image 1510. The fourth artificial neural network N4 may include at least one hidden layer and at least one output layer.

The hidden layer may transmit, to the output layer, data calculated based on synapse coupling strength and the input data transmitted from the input layer. The output layer may calculate output data on the basis of the data transmitted from the hidden layer and the synapse coupling strength.

The image mask 500 may be generated based on the output data. For example, the image mask 500 may be provided in the form of a p×q matrix. Alternatively, the image mask 500 may be provided as a filter having a size of p×q.

Meanwhile, the fourth artificial neural network N4 may be trained in various ways.

Figure 15:
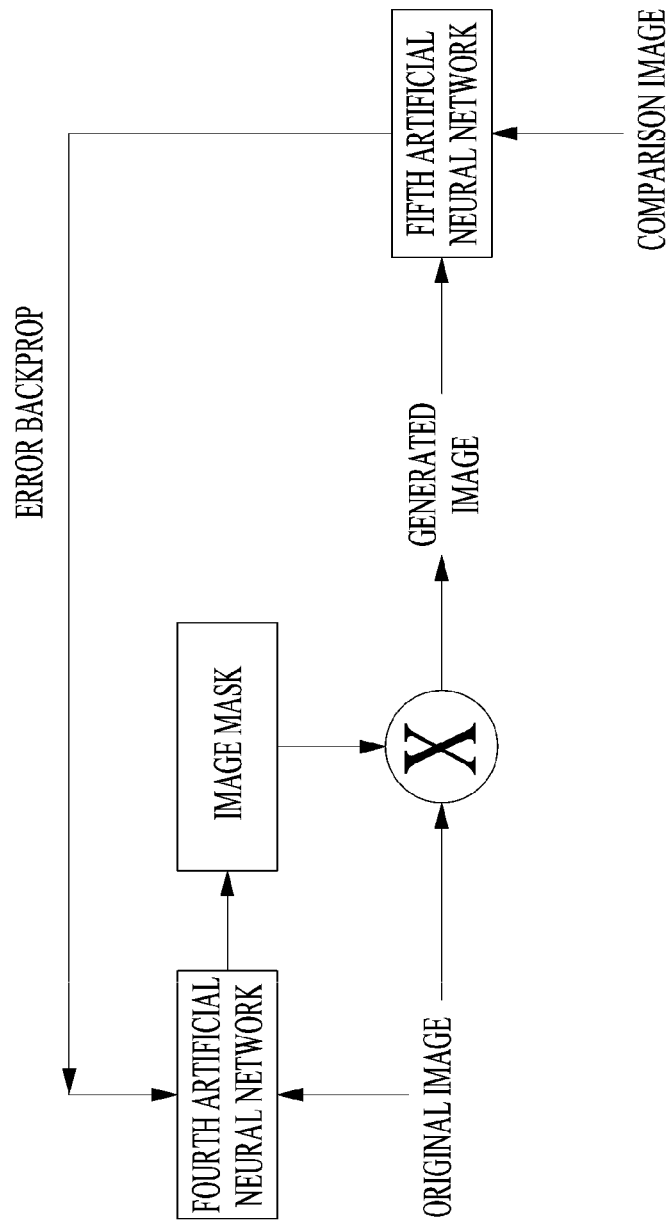
FIG. 15 is a diagram showing a training method of a fourth artificial neural network N4 according to an embodiment.

FIG. 15 is a diagram showing a training method of the fourth artificial neural network N4 according to an embodiment.

Referring to FIG. 15, the fourth artificial neural network N4 may receive an original image including environmental noise and generate an image mask. A generated image of which the environmental noise is reduced from the original image may be generated based on the original image and the image mask.

The fourth artificial neural network N4 may perform the pre-processing operation before or while generating the image mask. For example, the fourth artificial neural network N4 may perform an operation of selecting a portion of a plurality of original images.

A fifth artificial neural network N5 may obtain the generated image and the comparison image. The comparison image may correspond to the generated image. The comparison image may be related to the original image. For example, the comparison image may be an image of which the environmental noise is reduced from the original image.

The comparison image may be a labeling data. For example, the comparison image may include ground truth. Alternatively, the comparison image may be generated through a user or a program.

The fifth artificial neural network N5 may calculate an error on the basis of the generated image and the comparison image. The calculated error may be propagated back to the fourth artificial neural network N4.

The fourth artificial neural network N4 may update parameters on the basis of the error.

By repeating the above process, the fourth artificial neural network N4 may be trained.

A generated image of which an environmental noise is reduced may be obtained based on an image mask generated from the fourth artificial neural network N4 that has been already trained.

Meanwhile, an artificial neural network according to an embodiment may output an object information related to an obstacle included in the original image without pre-processing the original image.

For example, the sixth artificial neural network N6 may be trained to output the object information related to the obstacle included in the original image from the original image including the environmental noise.

In this case, as shown in FIG. 8, the sixth artificial neural network N6 may be trained based on a plurality of images having various kinds of noise and a plurality of comparison images corresponding to the plurality of images.

The sixth artificial neural network N6 that has been already trained may output the object information included in the original image from the original image including the environmental noise.

Figure 16:
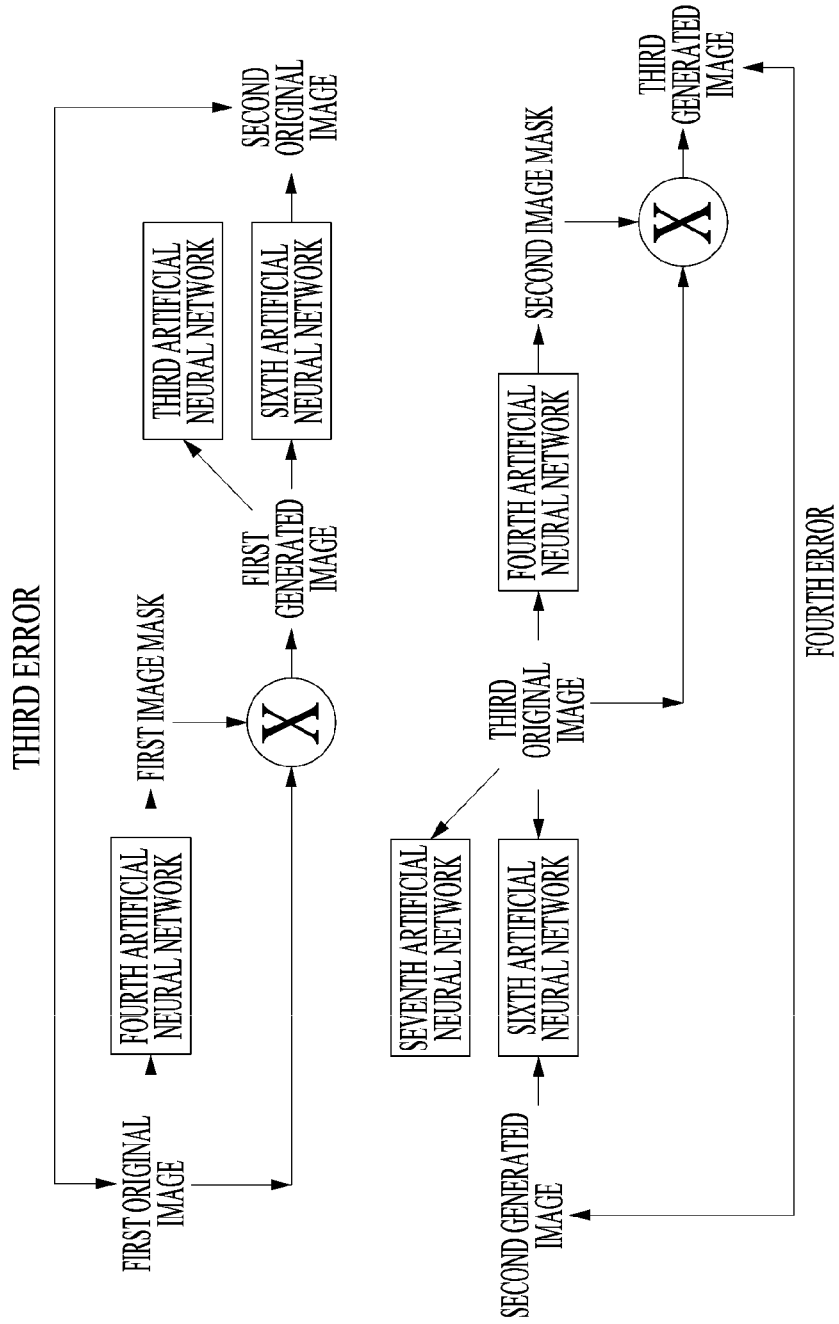
FIG. 16 is a diagram showing a training method of the fourth artificial neural network N4 according to another embodiment.

FIG. 16 is a diagram showing a training method of the fourth artificial neural network N4 according to another embodiment.

Referring to FIG. 16, the fourth artificial neural network N4 may receive a first original image including environmental noise and generate a first image mask. A first generated image of which the environmental noise is reduced from the first original image may be generated based on the first original image and the first image mask.

The first generated image may be input to the third artificial neural network N3. The first generated image may be an image of which the environmental noise is reduced from the first original image.

The third artificial neural network N3 may distinguish between the first generated image and a first comparison image corresponding to the first generated image. The first comparison image may be an image of which the environmental noise is reduced from the first original image. Alternatively, the first comparison image may be an image of which the environmental noise is removed from the first original image. The first comparison image may be a labeling data. For example, the first comparison image may include ground truth. Alternatively, the first comparison image may be generated through a user or a program.

For example, the third artificial neural network N3 may select one of the first generated image and the first comparison image. An error may be calculated based on the selection. The fourth artificial neural network N4 and the third artificial neural network N3 may be trained by the error being propagated back to at least one of the fourth artificial neural network N4 and the third artificial neural network N3. An error propagated back to the fourth artificial neural network N4 may be different from an error propagated back to the third artificial neural network N3.

The fourth artificial neural network N4 and the third artificial neural network N3 may form a generative adversarial network (GAN).

Meanwhile, the sixth artificial neural network N6 may receive the first generated image and output a second original image. The second original image may be an image of which the environmental noise is increased from the first generated image.

A third error may be calculated based on the first original image and the second original image. The fourth artificial neural network N4 may be trained such that the third error is minimized.

The sixth artificial neural network N6 may receive a second generated image and generate a third original image.

The third original image may be input to the seventh artificial neural network N7. The third original image may be an image of which the environmental noise is increased from the second generated image.

The seventh artificial neural network N7 may distinguish between the third original image and a second comparison image corresponding to the third original image. The second comparison image may be an image of which the environmental noise is increased from the second generated image. The second comparison image may be a labeling data. For example, the second comparison image may include ground truth. Alternatively, the second comparison image may be generated through a user or a program.

For example, the seventh artificial neural network N7 may select one of the third original image and the second comparison image. An error may be calculated based on the selection. The sixth artificial neural network N6 and the seventh artificial neural network N7 may be trained by the error being propagated back to at least one of the sixth artificial neural network N6 and the seventh artificial neural network N7. An error propagated back to the sixth artificial neural network N6 may be different from an error propagated back to the seventh artificial neural network N7.

The sixth artificial neural network N6 and the seventh artificial neural network N7 may form a generative adversarial network (GAN).

Meanwhile, the fourth artificial neural network N4 may receive the third original image and output a second image mask. A third generated image may be obtained based on the third original image and the second image mask. The third generated image may be an image of which an environmental noise is reduced from the third original image.

A fourth error may be calculated based on the second generated image and the third generated image. The fourth artificial neural network N4 may be trained such that the fourth error is minimized.

Meanwhile, the image mask may be updated based on a noise variation of the original image.

Figure 17:
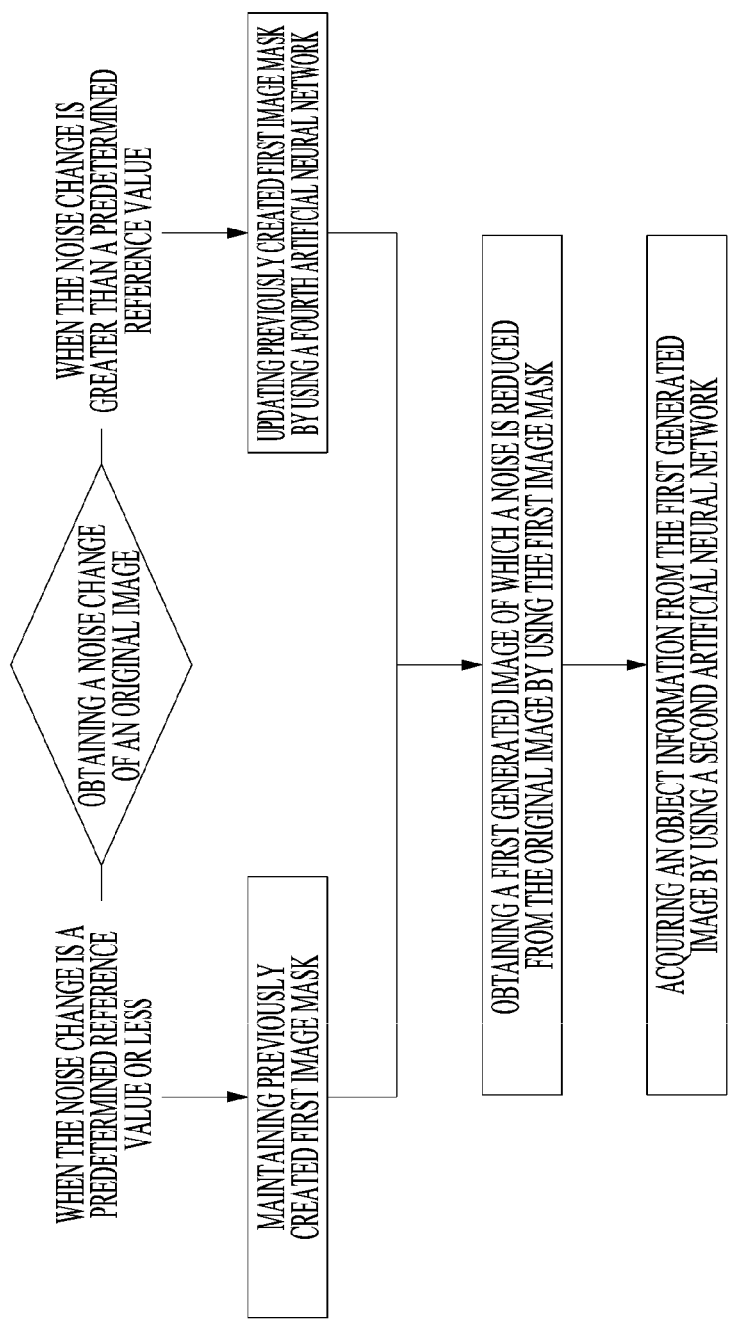
FIG. 17 is a flowchart for describing an object information acquisition method according to an embodiment.

FIG. 17 is a flowchart for describing an object information acquisition method according to an embodiment.

Referring to FIG. 17, the control unit 1 may obtain a noise variation of an original image. The original image may include environmental noise. The noise variation may refer to a variation of the environmental noise.

The original image may include a first original image of a first frame, a second original image of a second frame, which is a frame subsequent to the first frame, and a third original image, which is a frame subsequent to the second frame.

When the noise variation of the original image is less than or equal to a predetermined reference value, the control unit 1 may maintain a pre-generated first image mask. The first image mask may be an image mask that is generated by the fourth artificial neural network N4 based on the first original image.

The control unit 1 may obtain a first generated image of which a noise is reduced from the original image by using the first image mask. Herein, the original image may refer to the second original image. In this case, the control unit 1 may obtain the first generated image as in step S3100 of FIG. 12.

The control unit 1 may acquire an object information from the first generated image by using the second artificial neural network N2. In this case, the control unit 1 may acquire the object information as in step S4100 of FIG. 12.

When the noise variation of the original image is less than or equal to a predetermined reference value, the control unit 1 may deactivate the fourth artificial neural network N4. Thus, it is possible to decrease the total amount of computation of the control unit 1.

When the noise variation of the original image is greater than a predetermined reference value, the control unit 1 may update the first image mask by using the fourth artificial neural network N4. For example, the fourth artificial neural network N4 may generate a third image mask from the third original image. In this case, the control unit 1 may update the first image mask with the third image mask.

The control unit 1 may obtain a first generated image of which a noise is reduced from the original image by using the first image mask updated with the third image mask. The original image may refer to the third original image. In this case, the control unit 1 may obtain the first generated image as in step S3100 of FIG. 12.

The control unit 1 may acquire an object information from the first generated image by using the second artificial neural network N2. In this case, the control unit 1 may acquire the object information as in step S4100 of FIG. 12.

Figure 18:
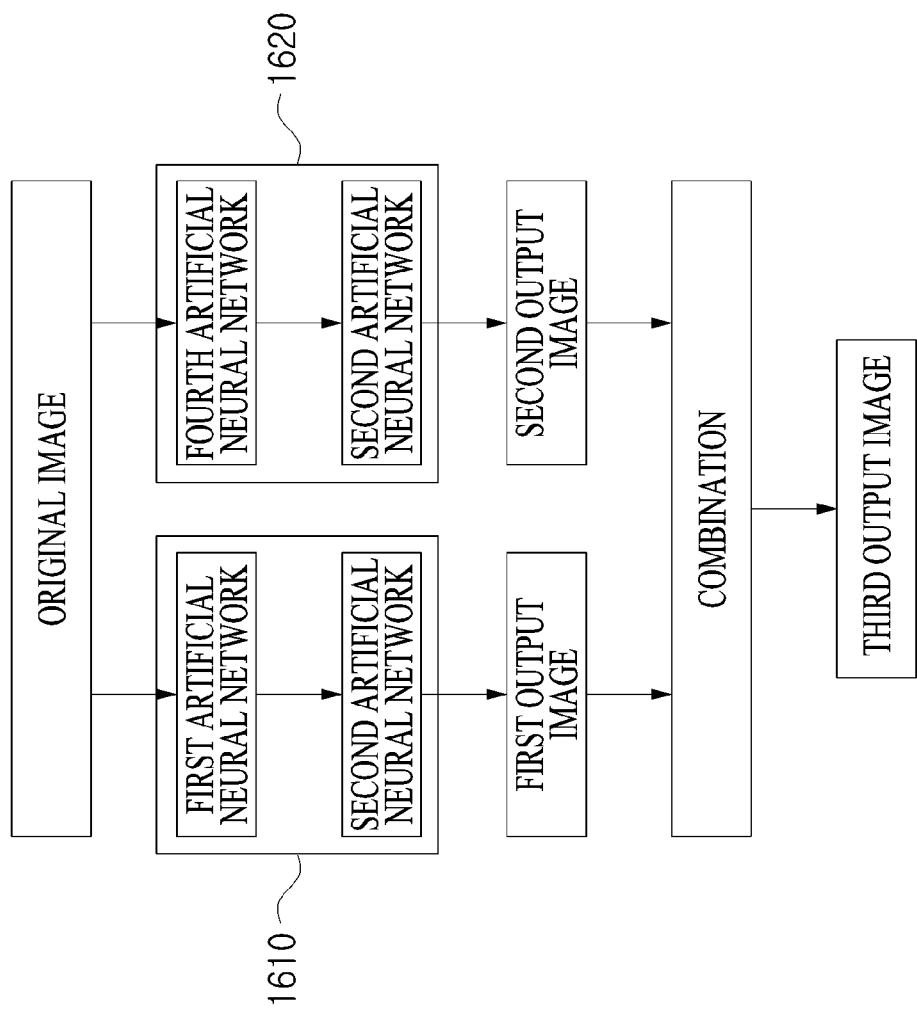
FIG. 18 is a diagram showing an object information acquisition method according to still another embodiment.

FIG. 18 is a diagram showing an object information acquisition method according to still another embodiment.

Referring to FIG. 18, a first network 1610 may receive an original image and output a first output image. A second network 1620 may receive the original image and output a second output image. The original image may include the environmental noise.

The first network 1610 may include the first artificial neural network N1 and the second artificial neural network N2.

The first artificial neural network N1 may generate an image of which the environmental noise is reduced from the original image as in step S2000 of FIG. 8. The control unit 1 may obtain a generated image of which the environmental noise is reduced.

The second artificial neural network N2 may acquire an object information from an image of which the environmental noise is reduced as in step S3000 of FIG. 8. Specifically, the second artificial neural network N2 may output a first output image including the object information.

The second network 1620 may include the fourth artificial neural network N4 and the second artificial neural network N2.

The fourth artificial neural network N4 may generate an image mask from the original image as in step S2100 of FIG. 12. Also, as in step S3100 of FIG. 12, the control unit 1 may acquire an image of which the environmental noise is reduced from the original image by using the generated image mask.

The second artificial neural network N2 may acquire an object information from an image of which the environmental noise is reduced as in step S4100 of FIG. 12. Specifically, the second artificial neural network N2 may output a second output image including the object information.

The object information included in the first output image and the object information included in the second output image may be different from each other.

A third output image may be generated by combining the first output image and the second output image. For example, a third output image may be generated through an ensemble of the first output image and the second output image.

The third output image may include the object information included in the original image. For example, the third output image may include distance information and type information of an obstacle included in the original image.

The object information included in the third output image may be more accurate than the object information included in the first output image and the object information included in the second output image. That is, when the combination step is performed, it is possible to improve the accuracy of the object information acquired by the control unit 1.

Meanwhile, the above-described object information acquisition method may vary in operation according to the degree of the environmental noise. For example, when the environmental noise is lower than a predetermined level, the image segmentation operation may be performed without pre-processing the original image. That is, it may not be necessary to generate the generated image from the original image.

Figure 19:
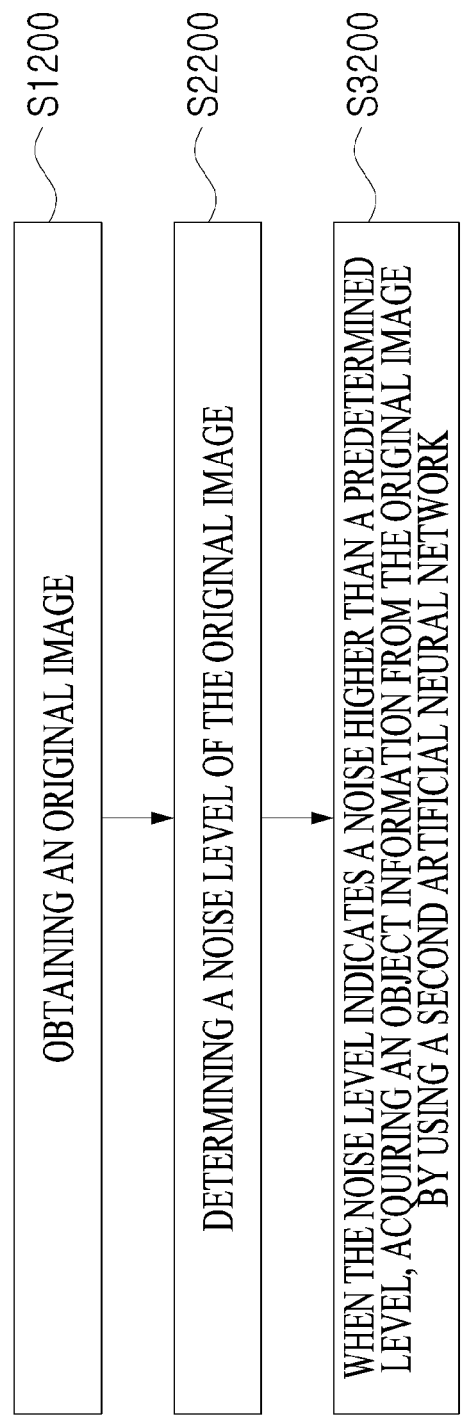
FIG. 19 is a flowchart showing an object information acquisition method according to an embodiment.

FIG. 19 is a flowchart showing an object information acquisition method according to an embodiment.

Referring to FIG. 19, the object information acquisition method may include a step of obtaining an original image (S1200), a step of obtaining a noise level of the original image (S2200), and a step of acquiring an object information from the original image by using the second artificial neural network when the noise level indicates a noise higher than a predetermined level (S3200).

Each step will be described in detail below.

First, the control unit 1 may obtain an original image (S1200). The original image may be provided as an image captured by a camera. For example, the original image may be a maritime image acquired by capturing a sea through a camera.

The original image may include an environmental noise. The environmental noise may refer to noise that exists around a place where the camera is installed, such as rain, fog, cloud, dust, and the like.

The control unit 1 may determine a noise level of the original image (S2200). For example, the control unit 1 may determine the noise level of the original image on the basis of a focus value (or a focus measure). Alternatively, the control unit 1 may determine the noise level of the original image on the basis of blurriness.

When the noise level indicates a noise higher than a predetermined level, the control unit 1 may acquire the object information from the original image using the second artificial neural network N2 (S3200). For example, a case of the noise level indicating a noise higher than a predetermined level may mean a case of the focus value being smaller than a predetermined magnitude.

The second artificial neural network N2 may receive the original image and output output data including information related to an object included in the original image.

For example, the second artificial neural network N2 may acquire distance information and type information related to an object included in the original image by performing the image segmentation operation.

Also, the second artificial neural network N2 may perform the pre-processing operation.

Meanwhile, when the noise level indicates a noise lower than a predetermined level, the control unit 1 may deactivate the first artificial neural network N1 and the fourth artificial neural network N4. Thus, it is possible to reduce the total amount of computation of the control unit 1. That is, it is possible to increase the object information acquisition speed.

On the other hand, when the noise level indicates a noise higher than a predetermined level, the object information acquisition method may be changed.

Figure 20:
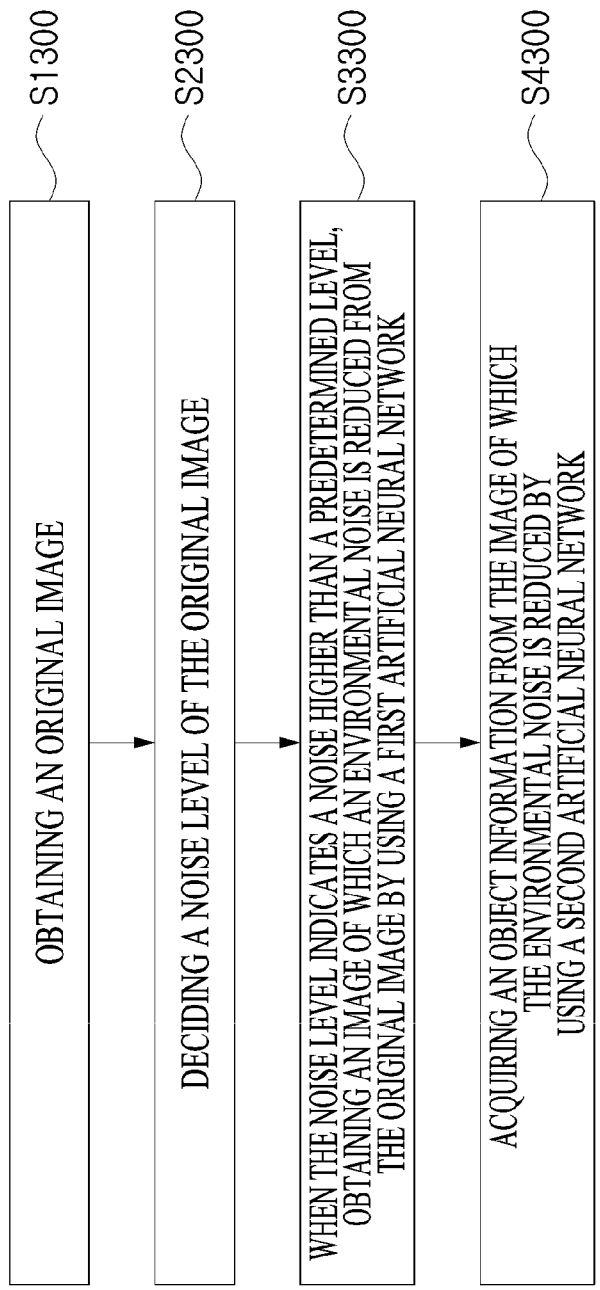
FIG. 20 is a flowchart showing an object information acquisition method according to another embodiment.

FIG. 20 is a flowchart showing an object information acquisition method according to another embodiment.

Referring to FIG. 20, the object information acquisition method may include a step of obtaining an original image (S1300), a step of obtaining a noise level of the original image (S2300), when the noise level indicates a noise higher than a predetermined level, a step of obtaining an image of which an environmental noise is reduced from the original image using the first artificial neural network (S3300), and a step of acquiring an object information from the image of which the environmental noise is reduced by using the second artificial neural network.

Each step will be described in detail below.

Meanwhile, the step of obtaining the original image (S1300) and the step of obtaining the noise level of the original image (S2300) may be performed in the same ways as the step of obtaining the original image S1200 and the step of determining the noise level S2200 of FIG. 16. Therefore, a detailed description thereof will be omitted, and the following description focuses on a difference with the object information acquisition method of FIG. 16.

When the noise level indicates a noise higher than a predetermined level, the control unit 1 may obtain an image of which an environmental noise is reduced from the original image by using the first artificial neural network N1 (S3300).

The step of obtaining the image of which the environmental noise is reduced may be performed in the same way as step S2000 of FIG. 8. Thus, a detailed description thereof will be omitted.

The control unit 1 may acquire an object information from the image of which the environmental noise is reduced by using the second artificial neural network N2 (S4300). Specifically, the control unit 1 may acquire an object information related to an obstacle included in the original image from the image of which the environmental noise is reduced by using the second artificial neural network N2.

The step of acquiring the object information may be performed in the same way as step S3000 of FIG. 8. Thus, a detailed description thereof will be omitted.

Figure 21:
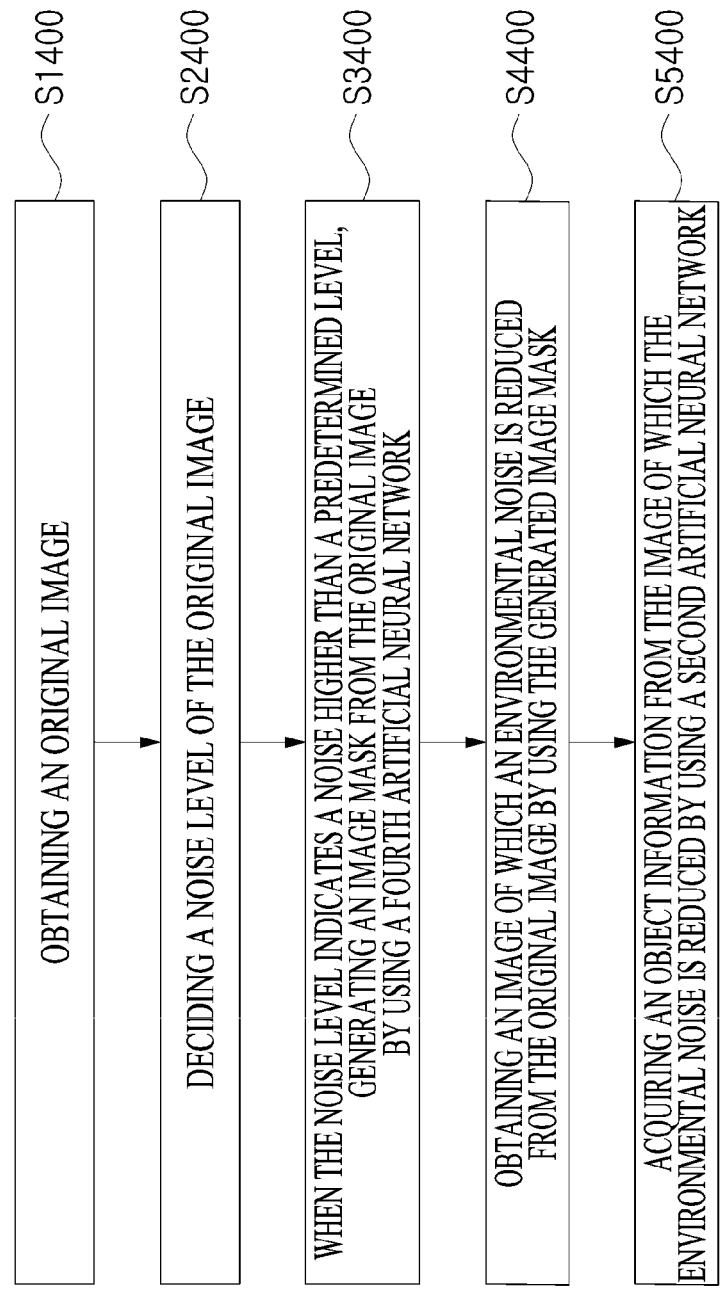
FIG. 21 is a flowchart showing an object information acquisition method according to still another embodiment.

FIG. 21 is a flowchart showing an object information acquisition method according to still another embodiment.

Referring to FIG. 21, the object information acquisition method may include a step of obtaining an original image (S1400), a step of obtaining a noise level of the original image (S2400), when the noise level indicates a noise higher than a predetermined level, a step of generating an image mask from the original image by using a fourth artificial neural network (S3400), a step of obtaining an image of which an environmental noise is reduced from the original image by using the generated image mask (S4400), and a step of acquiring an object information from the image of which the environmental noise is reduced by using a second artificial neural network (S5400).

Meanwhile, the step of obtaining the original image (S1400) and the step of obtaining the noise level of the original image (S2400) may be performed in the same ways as the step of obtaining the original image S1400 and the step of determining the noise level S2400 of FIG. 16.

Also, the step of generating the image mask (S3400) may be performed in the same way as step S2100 of FIG. 12.

The step of obtaining the image of which the environmental noise is reduced may be performed in the same way as step S3100 of FIG. 12.

The step of acquiring the object information (S5400) may be performed in the same way as step S4100 of FIG. 12.

Figure 22:
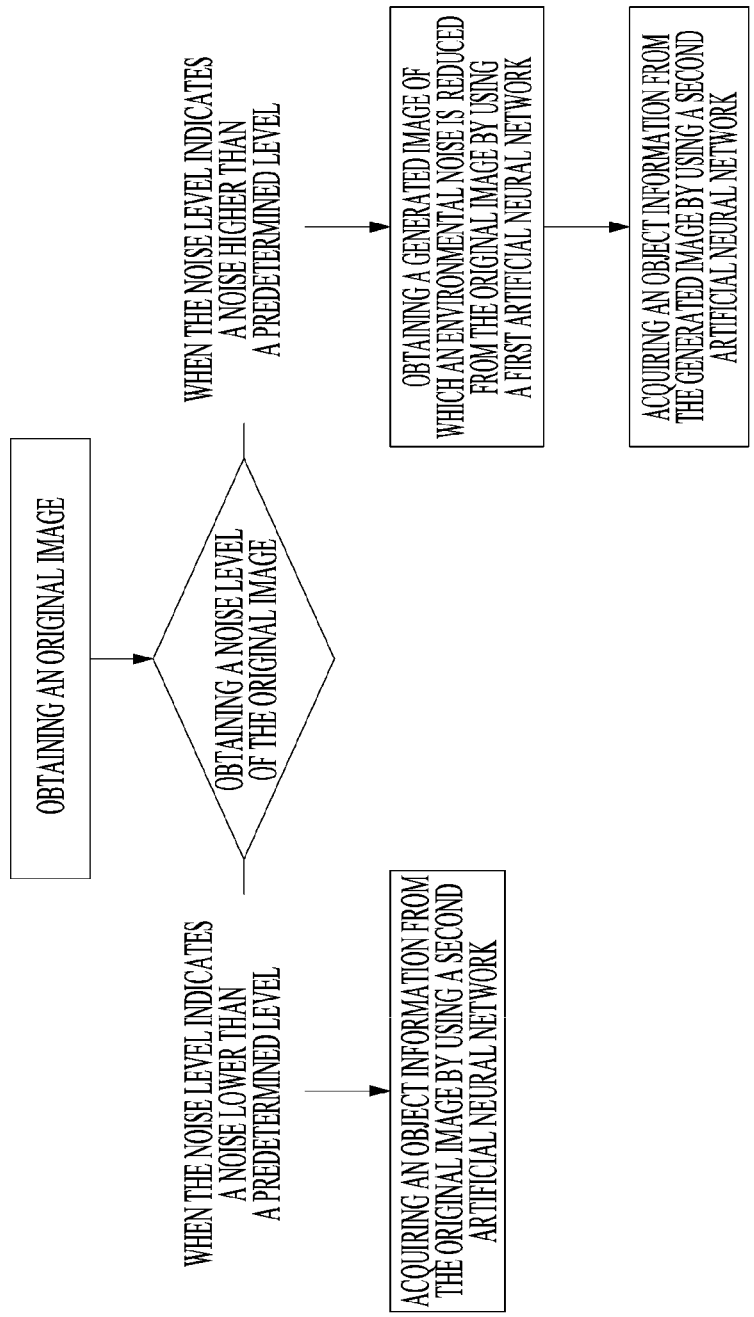
FIG. 22 is a flowchart showing an object information acquisition method according to an embodiment.

FIG. 22 is a flowchart showing an object information acquisition method according to an embodiment.

Referring to FIG. 22, the control unit 1 may obtain an original image. The operation of obtaining the original image may be performed in the same way as step S1200 of FIG. 19.

The control unit 1 may obtain a noise level of the original image. The operation of obtaining the noise level may be performed in the same way as step S2200 of FIG. 19.

When the noise level indicates a noise lower than a predetermined level, the control unit 1 may acquire an object information from the original image by using the second artificial neural network N2. The operation of acquiring the object information may be performed in the same way as step S3200 of FIG. 19.

When the noise level indicates a noise higher than a predetermined level, the control unit 1 may obtain a generated image of which an environmental noise is reduced from the original image by using the first artificial neural network N1. The operation of obtaining the generated image may be performed in the same way as step S3300 of FIG. 20.

The control unit 1 may acquire an object information from the generated image by using the second artificial neural network N2. The operation of acquiring the object information may be performed in the same way as step S4300 of FIG. 10.

FIG. 23 is a flowchart showing an object information acquisition method according to another embodiment.

Referring to FIG. 23, the control unit 1 may obtain an original image. The operation of obtaining the original image may be performed in the same way as step S1200 of FIG. 19.

The control unit 1 may obtain a noise level of the original image. The operation of obtaining the noise level may be performed in the same way as step S2200 of FIG. 19.

When the noise level indicates a noise lower than a predetermined level, the control unit 1 may acquire an object information from the original image by using the second artificial neural network N2. The operation of acquiring the object information may be performed in the same way as step S3200 of FIG. 19.

When the noise level indicates a noise higher than a predetermined level, the control unit 1 may generate an image mask from the original image by using the first artificial neural network N1. The operation of generating the image mask may be performed in the same way as step S3400 of FIG. 21.

The control unit 1 may obtain a generated image of which an environmental noise is reduced from the original image using the generated mask. The operation of obtaining the generated image may be performed in the same way as step S4400 of FIG. 21.

The control unit 1 may acquire an object information from the generated image by using the second artificial neural network N2. The operation of acquiring the object information may be performed in the same way as step S5400 of FIG. 21.

Meanwhile, the object information acquisition method considering environmental noise in an original image obtained by the control unit 1 has been described above.

The control unit 1 may perform the object information acquisition method in consideration of the state of a window of a housing where a camera for capturing the original image is installed. For example, the camera may be installed in a vessel. In this case, due to maritime environments, contaminants such as sea water may adhere to the window.

When a contaminant adheres to the window, the control unit 1 may perform an operation of generating an image of which an environmental noise is reduced from the original image. Herein, the contaminant may include various foreign substances such as water droplets and salt.

By performing the same operation as step S2000 of FIG. 8, the control unit 1 may obtain the image of which the environmental noise is reduced. Alternatively, by performing the same operations as step 2100 and step S3100 of FIG. 12, the control unit 1 may obtain the image of which the environmental noise is reduced.

By performing the same operation as step S3000 of FIG. 8, the control unit 1 may acquire an object information. Alternatively, by performing the same operation as step S4100 of FIG. 12, the control unit 1 may acquire an object information.

Meanwhile, the control unit 1 may perform the object information acquisition method in different manners depending on the degree of the contaminant.

For example, when the degree of the contaminant indicates a noise lower than a predetermined level, the control unit 1 may acquire an object information from the original image using the second artificial neural network N2.

On the other hand, when the degree of the contaminant indicates a noise higher than a predetermined level, the control unit 1 may obtain an image of which an environmental noise is reduced from the original image by using the first artificial neural network N1. The control unit 1 may acquire an object information from the image of which the environmental noise is reduced by using the second artificial neural network N2.

Alternatively, the control unit 1 may acquire an object information using an image mask as shown in FIG. 21. In this case, the image mask may be maintained during a predetermined frame as described above.

Meanwhile, the contaminant may be measured in various ways. For example, when the contaminant is salt, the degree of the contaminant may be measured by measuring the electrical conductivity of the housing. Alternatively, the degree of the contaminant may be measured by comparing the acquired original image to the comparison image corresponding to the original image. The comparison image may be stored in a memory or provided from a server.

The method according to an embodiment may be implemented as program instructions executable by a variety of computer means and may be recorded on a computer-readable medium. The computer-readable medium may include program instructions, data files, data structures, and the like alone or in combination. The program instructions recorded on the medium may be designed and configured specifically for an embodiment or may be publicly known and available to those who are skilled in the field of computer software. Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software modules in order to perform operations of an embodiment, and vise versa.

Although the present invention has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

MODE FOR INVENTION

As described above, associated details are provided in the detailed description of the embodiments.

The invention claimed is:

1. A method for acquiring an object information, comprising:
obtaining an input image acquired by capturing a sea;
obtaining a noise level of the input image, the noise level reflecting an environmental noise of the input image;
when the noise level indicates a noise lower than a predetermined level, acquiring an object information related to an obstacle included in the input image from the input image by using a first artificial neural network wherein the first artificial neural network outputs, from an image, an object information related to at least one selected from the group of a distance and a type of an object included in the image; and
when the noise level indicates a noise higher than the predetermined level, obtaining a noise-reduced image of which the environmental noise is reduced from the input image by using a second artificial neural network trained to generate, from a first image including a noise, a second image of which the noise included in the first image is reduced, and acquiring an object information related to an obstacle included in the sea from the noise-reduced image by using the first artificial neural network, wherein the second artificial neural network is trained by using a first error calculated from a third artificial neural network discriminating the second image and a reference image corresponding to the first image and having a noise lower than the first image.

2. The method of claim 1, wherein the first artificial neural network is trained based on an output data and a labeling data corresponding to the output data, the output data including a first classification value determined by reflecting the type and corresponding to a sea, and a second classification value determined by reflecting the distance and the type and corresponding to an obstacle.

3. The method of claim 1, wherein the environmental noise includes at least one selected from the group of a rain, a fog and a cloud.

4. The method of claim 1, wherein the obtaining the input image comprises selecting a portion of a plurality of images.

5. The method of claim 4, wherein the selecting is generating an image by compositing an image having the highest illuminance among the plurality of images and an image having the lowest illuminance among the plurality of images.

6. The method of claim 1, wherein the obtaining the input image comprises RGB normalizing the input image.

7. The method of claim 1, wherein the obtaining the noise level comprises measuring an average focus measure of the input image.

8. The method of claim 1, wherein the second artificial neural network is trained to minimize the first error.

9. The method of claim 1, wherein the second artificial neural network is trained to minimize a second error calculated based on a comparison of a third image outputted from a fourth artificial neural network and the first image, the fourth artificial neural network generating the third image having a noise higher than the second image inputted to the fourth artificial neural network.

10. A method for acquiring an object information, comprising:
  obtaining an input image acquired by capturing a sea;
  obtaining a noise level of the input image, the noise level reflecting an environmental noise of the input image;
  when the noise level indicates a noise lower than a predetermined level, acquiring an object information related to an obstacle included in the input image from the input image by using a first artificial neural network wherein the first artificial neural network outputs, from an image, an object information related to at least one selected from the group of a distance and a type of an object included in the image; and
  when the noise level indicates a noise higher than the predetermined level, generating a noise-reducing mask from the input image by using a second artificial neural network trained to generate an image mask from a first image including a noise, obtaining a generated image of which the environmental noise is reduced from the input image by using the noise-reducing mask, and acquiring an object information related to an obstacle included in the sea from the generated image by using the first artificial neural network, wherein the second artificial neural network is trained by using a first error calculated from a third artificial neural network discriminating a second image and a reference image corresponding to the first image and having a noise lower than the first image, the second image being generated based on an image mask generated from the second artificial neural network and the first image.

11. The method of claim 10, wherein the first artificial neural network is trained based on an output data and a labeling data corresponding to the output data, the output data including a first classification value determined by reflecting the type and corresponding to a sea, and a second classification value determined by reflecting the distance and the type and corresponding to an obstacle.

12. The method of claim 10, wherein:
  the input image includes a first input image and a second input image that is a subsequent frame of the first input image, and
  when the noise level indicates a noise higher than the predetermined level and a difference between a first characteristic of the first input image and a second characteristic of the second input image is smaller than a predetermined reference value, generating a first noise-reducing mask from the first input image, obtaining a first generated image of which the environmental noise is reduced from the first input image by using the first image mask, and acquiring an object information related to an obstacle included in the first input image from the first generated image by using the first artificial neural network, and
  when the noise level indicates a noise higher than the predetermined level and the difference between the first characteristic and the second characteristic is higher than the predetermined reference value, generating a second noise-reducing mask from the second input image, obtaining a second generated image of which the environmental noise is reduced from the second input image by using the second image mask, and acquiring an object information related to an obstacle included in the sea from the second generated image by using the first artificial neural network.

13. The method of claim 12, wherein each of the first characteristic and the second characteristic includes a noise level and a RGB value of a pixel.

14. The method of claim 10, wherein the second artificial neural network is trained to minimize a second error calculated based on a comparison of a third image outputted from a fourth artificial neural network and the first image, the fourth artificial neural network generating the third image having a noise higher than the second image inputted to the fourth artificial neural network.

15. The method of claim 10, wherein the noise-reducing mask is maintained for a predetermined frame.

16. A device for acquiring an object information, comprising:
  a camera mounted on a vessel and capturing a sea; and
  a controller configured to:
  obtain an input image captured by the camera;
  obtain a noise level of the input image, the noise level reflecting an environmental noise of the input image;
  when the noise level indicates a noise lower than a predetermined level, acquiring an object information related to an obstacle included in the input image from the input image by using a first artificial neural network wherein the first artificial neural network outputs, from an image, an object information related to at least one selected from the group of a distance and a type of an object included in the image; and
  when the noise level indicates a noise higher than the predetermined level, generating a noise-reducing mask from the input image by using a second artificial neural network trained to generate an image mask from a first image including a noise, obtaining a generated image of which the environmental noise is reduced from the input image by using the noise-reducing mask, and acquiring an object information related to an obstacle included in the sea from the generated image by using the first artificial neural network, wherein the second artificial neural network is trained by using a first error calculated from a third artificial neural network discriminating a second image and a reference image corresponding to the first image and having a noise lower than the first image, the second image being generated based on an image mask generated from the second artificial neural network and the first image.

* * * * *